US00RE47509E

(19) United States
(12) Reissued Patent
Yoshida et al.

(10) Patent Number: US RE47,509 E
(45) Date of Reissued Patent: *Jul. 9, 2019

(54) IMAGE FORMING APPARATUS

(71) Applicant: SHARP KABUSHIKI KAISHA, Sakai-shi, Osaka (JP)

(72) Inventors: Mayuko Yoshida, Sakai (JP); Shinsaku Tohki, Sakai (JP)

(73) Assignee: SHARP KABUSHIKI KAISHA, Sakai (JP)

( * ) Notice: This patent is subject to a terminal disclaimer.

(21) Appl. No.: 15/202,837

(22) Filed: Jul. 6, 2016

Related U.S. Patent Documents

Reissue of:
(64) Patent No.: 8,582,131
Issued: Nov. 12, 2013
Appl. No.: 13/273,913
Filed: Oct. 14, 2011

U.S. Applications:
(63) Continuation of application No. 15/202,768, filed on Jul. 6, 2016, which is an application for the reissue of Pat. No. 8,582,131.

(30) Foreign Application Priority Data

Oct. 25, 2010 (JP) ..... 2010-238890
Oct. 26, 2010 (JP) ..... 2010-239319

(51) Int. Cl.
*G06F 15/00* (2006.01)
*H04N 1/00* (2006.01)

(52) U.S. Cl.
CPC ..... *H04N 1/00411* (2013.01); *H04N 1/00424* (2013.01); *H04N 1/00427* (2013.01);
(Continued)

(58) Field of Classification Search
CPC ..... H04N 1/00411; H04N 1/00424; H04N 1/00427; H04N 1/00448; H04N 1/00458;
(Continued)

(56) References Cited

U.S. PATENT DOCUMENTS

2004/0243697 A1* 12/2004 Otsuka et al. ..... 709/223
2006/0181750 A1 8/2006 Lu et al.
(Continued)

FOREIGN PATENT DOCUMENTS

JP 2001-086298 A 3/2001
JP 2003-219245 A 7/2003
(Continued)

OTHER PUBLICATIONS

Yoshida et al., "Image Forming Apparatus", U.S. Appl. No. 13/273,913, filed Oct. 14, 2011.
(Continued)

*Primary Examiner* — Joshua D Campbell
(74) *Attorney, Agent, or Firm* — Keating & Bennett, LLP

(57) ABSTRACT

An image forming apparatus includes a document reader, a storage for storing image data, an image output unit and a control unit. The control unit includes a display image generator for generating a display image, a display panel and a control unit-side controller having a function of presenting the display image based on the image data input in a preview representation and an output processing function of implementing an output process. As the output processing function, two schemes are provided: a first output scheme wherein, when image data has been input through the input unit, the images are output after displaying the images to be output in a preview representation on a display panel, and a second output scheme wherein, when image data has been input through the input unit, the image is directly output without displaying the image to be output in a preview representation on the display panel.

14 Claims, 28 Drawing Sheets

(52) U.S. Cl.
CPC ..... *H04N 1/00448* (2013.01); *H04N 1/00458* (2013.01); *H04N 1/00469* (2013.01); *H04N 1/00474* (2013.01); *H04N 1/00482* (2013.01); *H04N 1/00503* (2013.01); *H04N 2201/0094* (2013.01); *H04N 2201/3288* (2013.01)

(58) Field of Classification Search
CPC ..... H04N 1/00469; H04N 1/00474; H04N 1/00482; H04N 1/00503; H04N 2201/0094; H04N 2201/3288
USPC ..... 358/1.13
See application file for complete search history.

(56) References Cited

U.S. PATENT DOCUMENTS

| | | | | |
|---|---|---|---|---|
| 2008/0201378 | A1 | 8/2008 | Nagahara et al. | |
| 2009/0265625 | A1 | 10/2009 | Tamai et al. | |
| 2010/0146462 | A1 | 6/2010 | Ishizawa | |
| 2010/0149590 | A1* | 6/2010 | Nishiyama et al. | 358/1.15 |

FOREIGN PATENT DOCUMENTS

| | | | |
|---|---|---|---|
| JP | 2005-142989 | A | 6/2005 |
| JP | 2006-003568 | A | 1/2006 |
| JP | 2006-003658 | A | 1/2006 |
| JP | 2006-171861 | A | 6/2006 |
| JP | 2008-205903 | A | 9/2008 |
| JP | 2009-088694 | A | 4/2009 |
| JP | 2009-175935 | A | 8/2009 |
| JP | 2009-260696 | A | 11/2009 |
| JP | 2010-034844 | A | 2/2010 |
| JP | 2010-074251 | A | 4/2010 |
| JP | 2010-134859 | A | 6/2010 |
| JP | 2010-142973 | A | 7/2010 |
| JP | 2010-147569 | A | 7/2010 |
| JP | 2010-147578 | A | 7/2010 |
| JP | 2010-151972 | A | 7/2010 |
| JP | 2010-204879 | A | 9/2010 |
| JP | 2011-114845 | A | 6/2011 |

OTHER PUBLICATIONS

Yoshida et al., "Image Forming Apparatus", U.S. Appl. No. 15/202,768, filed Jul. 6, 2016.

* cited by examiner

IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,582,131. The reissue applications are application Ser. Nos. 15/202,768 and 15/202,837 (the present application), both of which are reissue applications of U.S. Pat. No. 8,582,131. Application Ser. No. 15/202,837 (the present application) is a continuation reissue application of application Ser. No. 15/202,768.*

This Nonprovisional application claims priority under 35 U.S.C. §119 (a) on Patent Application No. 2010-238890 filed in Japan on 25 Oct. 2010 and Patent Application No. 2010-239319 filed in Japan on 26 Oct. 2010, the entire contents of which are hereby incorporated by reference.

BACKGROUND OF THE INVENTION (1) Field of the Invention

The present invention relates to an image forming apparatus such as a copier, printer, facsimile machine or the like, in particular, relating to an image forming apparatus equipped with an image display control device capable of displaying plural pages of document images in preview representation.

(2) Description of the Prior Art

Recently, there have been known image forming apparatus that include an image display control device capable of multiple pages of document images in a preview representation. In such image forming apparatus, it is possible to confirm the documents that have been scanned before printout by displaying the processed result of the scanned (prescanned) documents before execution of a job.

As a prior art example, there has been disclosed a configuration of an image forming apparatus which scans documents and then performs image processes on the scanned document images to thereby output printed material (see Patent Document 1).

According to the above image forming apparatus, in the image processor, a finish information generator generates expected finish information based on the image data captured by the scanner and an input pane information generator generates an input pane to display it on the display. When the operator, whilst viewing the displayed, expected finish screen, inputs settings through the input pane, the setter receives the settings and the finish information generator generates a finish information screen based on the received settings, the input pane information generator generates input pane information, and the display unit displays the expected finish and the input pane.

The control display unit includes a microphone, an input unit, a display unit and a speaker, and may input settings by voice through the microphone, may input settings using the input unit such as a keyboard, touch panel or the like, and may display menu items of settings on the display unit. The display unit adds voice output using the speaker other than visual display.

In this way, by reading documents before setting operations for several kinds of functions by users to display the expected finish condition, it is possible to provide an image forming apparatus that is highly efficient in setting operations with improved convenience.

[Prior Art Documents]

Patent Document 1

Japanese Patent Application Laid-open 2006-3568

However, as in the technology disclosed in Patent Document 1, in the image forming apparatus having a function of displaying a preview of the images to be output to enable the user to check, it is only possible to start an output process after user's confirmation of finished images before output. That is, there has been the problem that it is impossible to achieve an output process in conformity with the intention of the user who wants to omit checking work before output (the user who puts weight on quickness), hence it is impossible to meet user needs.

SUMMARY OF THE INVENTION

The present invention has been devised in view of the above prior art problems, it is therefore an object of the present invention to provide an image forming apparatus with improved convenience in which an image output process can be implemented in conformity with user's intention.

It is another object of the present invention to provide an image forming apparatus that is improved in convenience so that preview checking work can be cancelled whenever the user wants and that makes it possible to achieve an image output process in conformity with user's intention.

The first aspect of the invention resides in an image forming apparatus comprising:

an input unit receiving image data;

an output unit outputting an image formed based on the image data;

a storing unit storing the image data input from the input unit; and, an image display control unit, and is characterized in that the image display control unit includes:

a display image generator generating a display image based on the image data stored in the storing unit;

a display unit displaying the display image generated by the display image generator; and, a display controller including a function of presenting the display image based on the image data input from the input unit, in a preview representation and an output processing function of implementing an output process by means of the output unit, and the display controller controls a first output scheme in which, when image data has been input through the input unit, the images to be output are displayed in a preview representation on the display unit, and then are output by means of the output unit, and a second output scheme in which, when image data has been input through the input unit, the image to be output are not directly displayed in a preview representation on the display unit, but are directly output by means of the output unit.

The second aspect of the present invention resides in that in the output process by means of the output unit, an identical display is used as the standby screens to be displayed on the display unit for starting the output process, for both the first output scheme and the second output scheme.

The third aspect of the present invention resides in that in the output process by means of the output unit, the operations after an output start command is given are different between the first output scheme and the second output scheme.

For example, since, in the first output scheme, image data has been scanned before an output start command is given, an output process may be performed based on the image data that has been already scanned when an output start command is given. In the second output scheme, an output start command is given first, then image data is scanned so as to perform an output process based on the scanned image data.

The fourth aspect of the present invention resides in the display controller includes an output scheme switching function controller which, when a command for starting image output by means of the output unit is given during an output process based on the first output scheme, stops the preview display and switches the operation to that based on the second output scheme to perform image output.

The fifth aspect of the present invention resides in that the display controller includes an input continuation function controller which, when a command for starting image output by means of the output unit is given during an output process based on the first output scheme, starts image output of the image data that has been already input and continues input of image data that has not yet been input.

The sixth aspect of the present invention resides in that the display controller includes an output start command key displaying function controller which displays an output start command key for instructing the start of image output by means of the image output unit, on the display unit during the output process of the first output scheme.

The seventh aspect of the present invention resides in that the display controller includes an output stop command key displaying function controller which displays an output stop command key for instructing the stoppage of output until image data that has not been yet input ends when the start of image output by the means of image output unit is directed during the output process of the first output scheme.

The eighth aspect of the present invention resides in that the display controller includes an output command acceptance notifying function controller which notifies that the start of image output by means of the image output unit can be directed during the output process of the first output scheme.

The ninth aspect of the present invention resides in that the display controller includes an operation status notifying function controller which notifies the operation status of the apparatus when the start of image output by means of the image output unit is directed during the output process of the first output scheme.

According to the first aspect of the present invention, two types of output schemes are made possible so as to implement an output process in conformity with user's intention, whereby it is possible to meet user needs. For example, when the user puts weight on the finished condition, it is possible for the user to check the output content by preview images in advance before performing an output process. When the user puts weight on quickness of output processing, it is possible to implement a direct output process for the input data.

According to the second aspect of the present invention, no matter it is the case where an output process is performed after preview confirmation by scan-in operation, or no matter it is the case where an output process is performed instantly, it is possible to promote the user to start operating smoothly without being puzzled due to difference in input control depending on the output scheme that user wants to select.

According to the third aspect of the present invention, it is possible to implement an output process efficiently by the image forming apparatus that operates in conformity with the output process to be done.

According to the fourth aspect of the present invention, it is possible to give an output command in the middle of input (scan-in) of image data, hence it is possible for the user to start output at any time the user wants without waiting for completion of the scan-in operation when a large amount of documents need to be scanned in, or when a scan-in operation is started by mistake.

As a result, it is possible to provide an image forming apparatus that is improved in convenience and can implement an image output process in conformity with user's intention.

According to the fifth aspect of the present invention, since it is possible to continue scanning of image data that has not yet been input and output the image data that has been already input, simultaneously, it is possible to shorten the processing time.

According to the sixth aspect of the present invention, an output start command key is displayed during a scan-in operation of the first output scheme. It is hence possible for the user to give an output start command at any timing the user wants even in the middle of the scan-in operation.

According to the seventh aspect of the present invention, since it is possible to give a command of stopping output during input of image data that has not been yet input, it is possible to stop image output (or stop scanning) to make the apparatus ready for a next job. With this arrangement, it is possible to shorten the loss time up to execution of the next operation and hence improve operativity.

According to the eighth aspect of the present invention, it is possible to notify (make) the user (recognize) that an output command is acceptable in the middle of a scan-in operation.

According to the ninth aspect of the present invention, even a user who is unfamiliar with the apparatus can grasp the operation status of the apparatus when an output command is given in the middle of a scan-in operation, hence can use the apparatus without confusion.

DESCRIPTION OF THE PREFERRED EMBODIMENTS (The First Embodiment)

The embodiment of the present invention will hereinafter be described with reference to the accompanying drawings.

Figure 1:
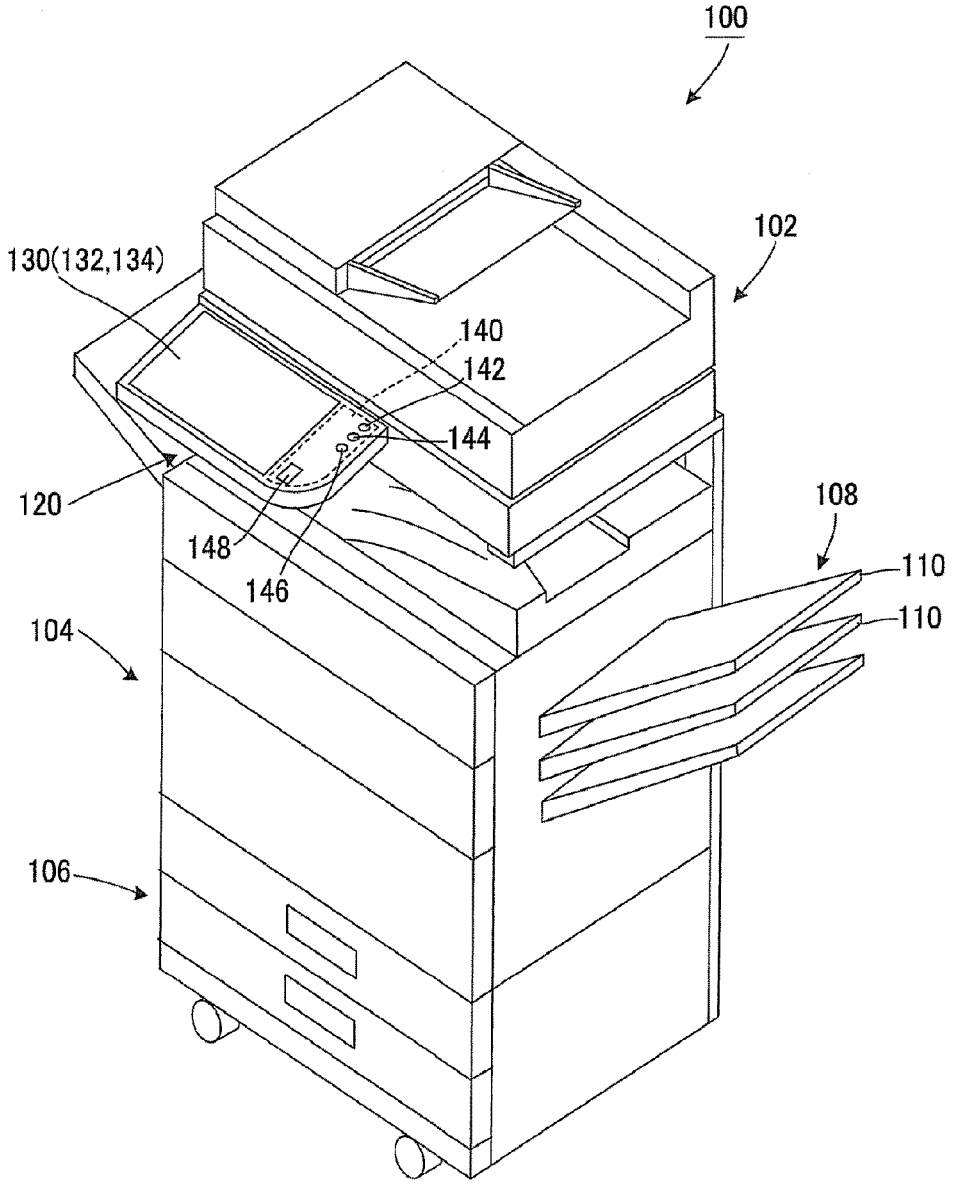
FIG. 1 is an illustrative view showing an overall configuration of an image forming apparatus according to the first and second embodiments of the present invention.
Figure 2:
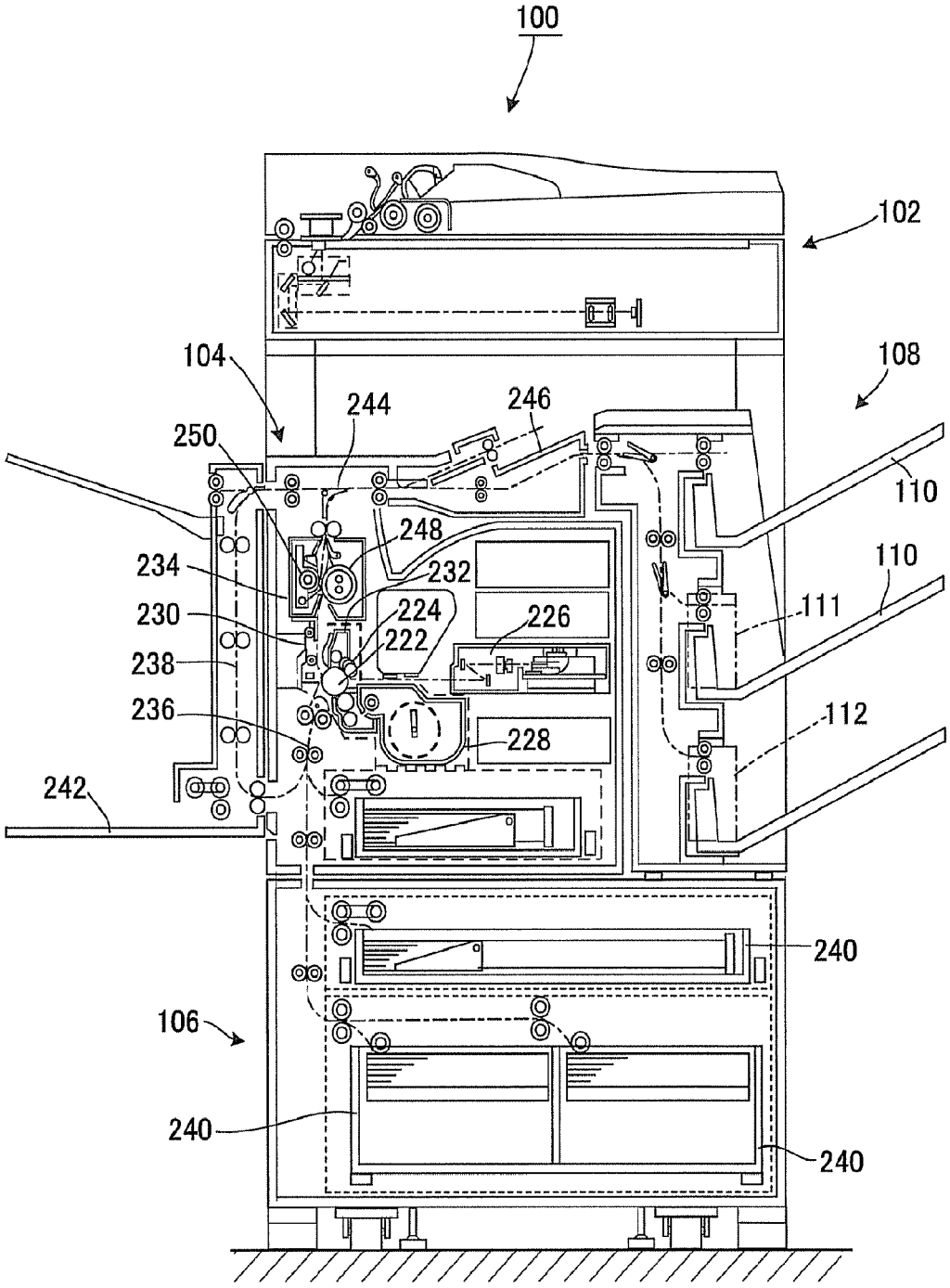
FIG. 2 is an illustrative view schematically showing the internal mechanisms of the image forming apparatus.
Figure 3:
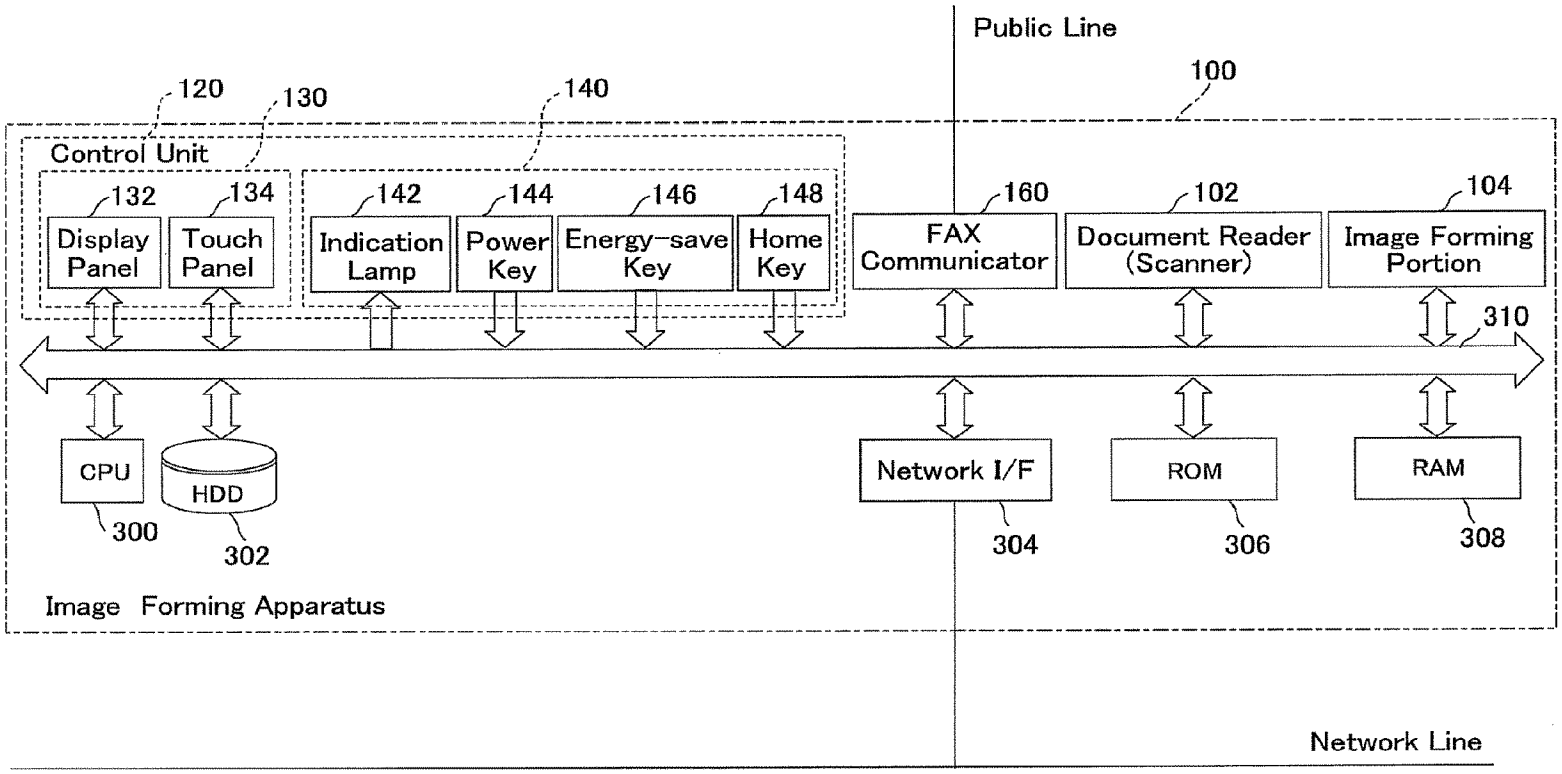
FIG. 3 is a functional block diagram showing a hardware configuration of the image forming apparatus.
Figure 4:
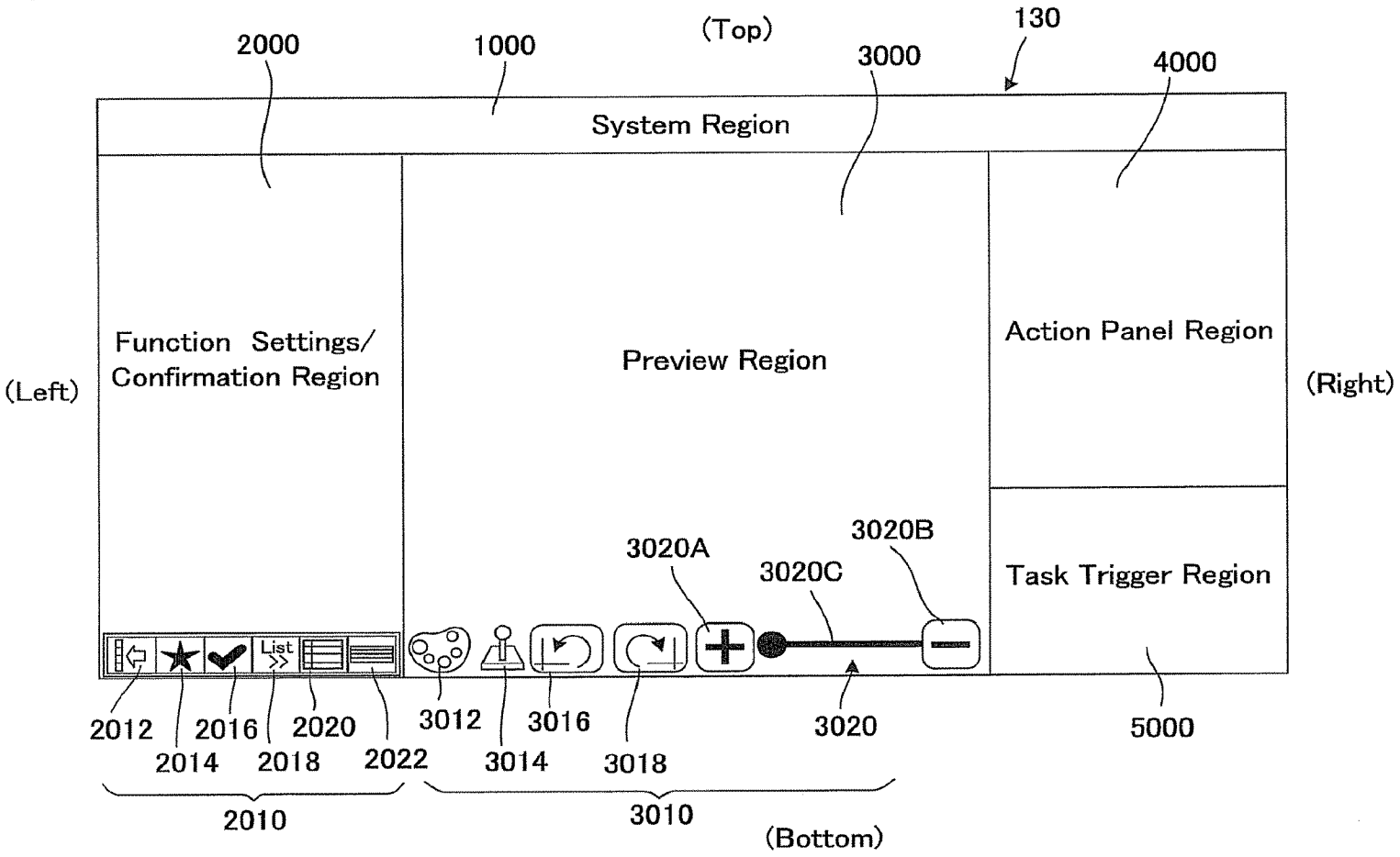
FIG. 4 is an illustrative view showing display regions on a touch panel display of the image forming apparatus.
Figure 5:
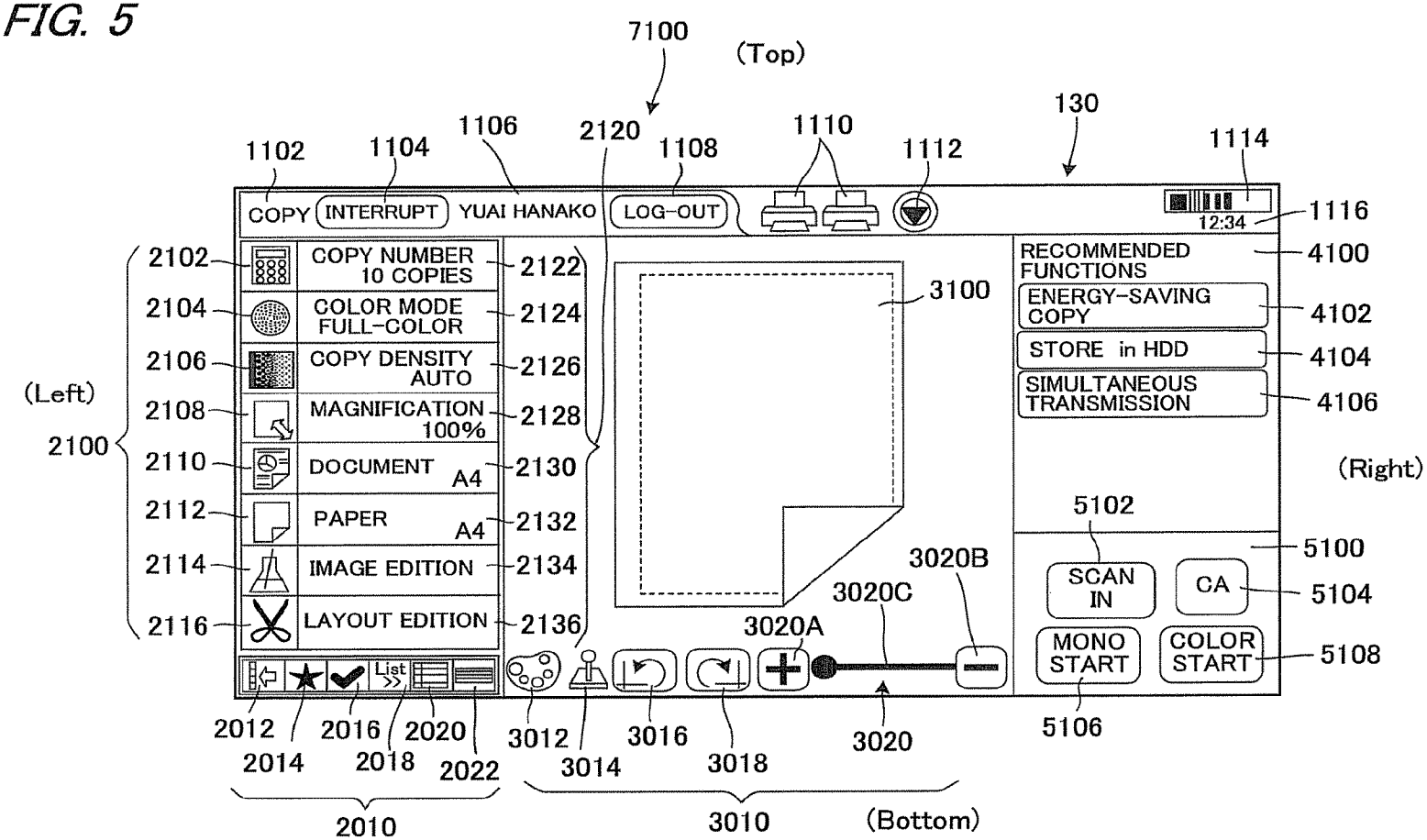
FIG. 5 is an illustrative view showing a screen example displayed on the touch panel display.
Figure 6:
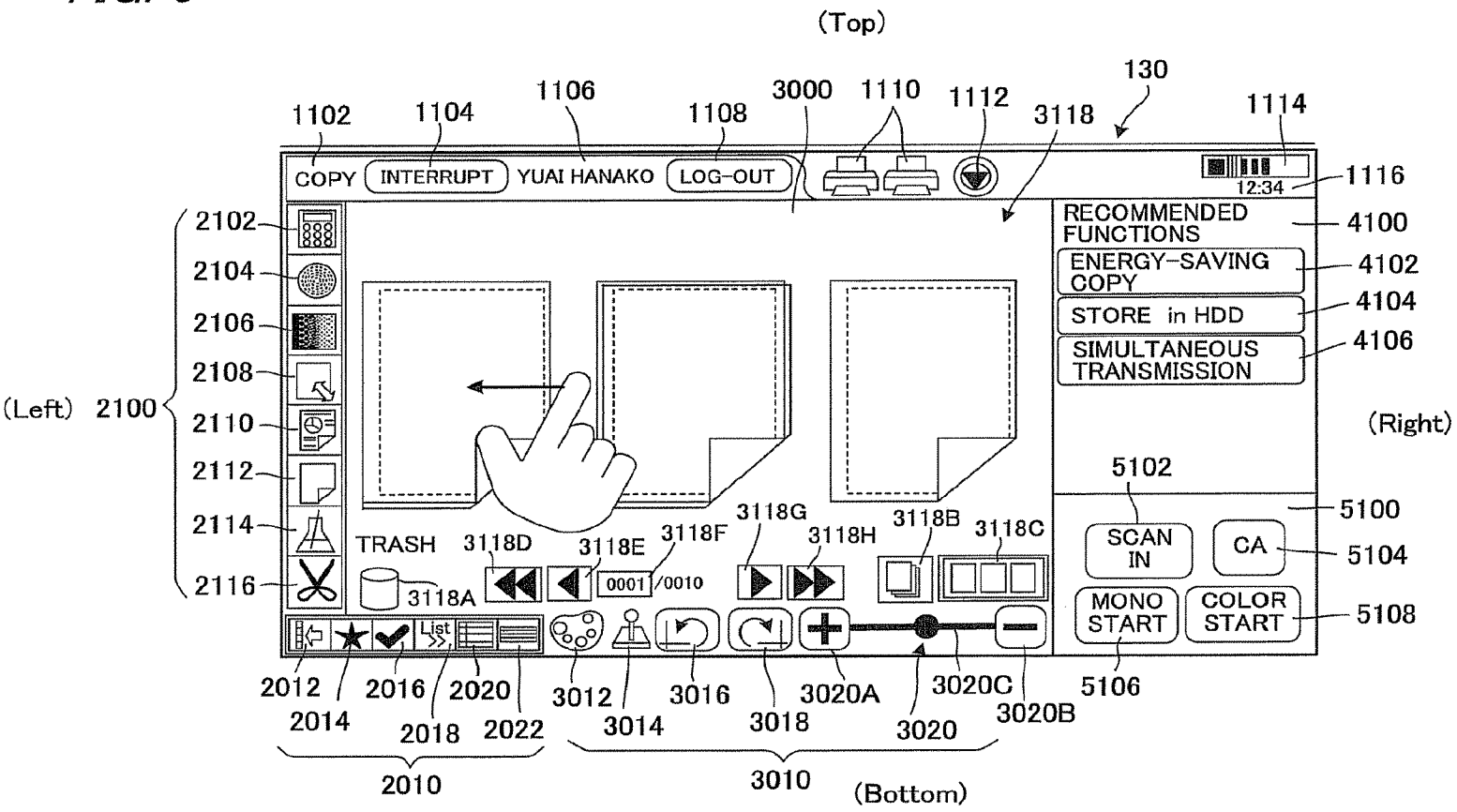
FIG. 6 is an illustrative view showing a state where the preview region being displayed on the touch panel display is changed.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing a preview display region on a touch panel display of the image forming apparatus. FIG. 5 is an illustrative view showing a screen example displayed on the touch panel display. FIG. 6 is an illustrative view showing a state where the preview region being displayed on the touch panel display is modified.

An image forming apparatus 100 according to the embodiment of the present invention includes: as shown in FIG. 1, a document reader (input unit) 102 for capturing image data; an image forming portion 104 for forming an image on a recording medium based on the image data input through document reader 102; an image output unit (output unit) 107 (see FIG. 9) for outputting the image formed based on the image data; and a control unit (image display control device) 120 having a display panel (display portion) 132 for displaying preview images based on image data and a control unit-side controller (display controller) 131 (see FIG. 9) having a function of giving a display image based on the image data input through the document reader 102, in a preview representation on display panel 132.

Control unit-side controller 131 includes an output processing function controller 1311 (see FIG. 10), which effects two kinds of processing, that is, the first output scheme in which, when image data has been input through document reader 102, the images are output after displaying the images to be output in a preview representation on display panel 132 and the second output scheme in which, when image data has been input through document reader 102, the image is directly output without displaying the image to be output in a preview representation on display panel 132.

The multiple document images displayed on display panel 132 may include preview display images of document images captured by the document reader etc., of image forming apparatus 100 and preview images of finished images to be formed on recording paper by the image forming portion.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The image forming apparatus 100 changes the display content on the screen for every operation mode. Further, the printing mechanism is not limited to electrophotography.

To begin with, image forming apparatus 100 will be described.

Image forming apparatus 100 of the present embodiment includes document reader 102, image forming portion 104, a paper feed portion 106, a paper output processor 108 and a control unit 120, as shown in FIG. 1.

Control unit 120 is formed of a touch panel display 130 and a display control portion 140.

Touch panel display 130 is comprised of a display panel 132 of a liquid crystal panel or the like and a touch panel (touch control detecting means) 134 that is laid over display panel 132 to detect the positions the user presses with fingers.

Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted based on an image signal format conforming to this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Displayed on display panel 132 of touch panel display 130 are the home screen for selection of the operational mode of image forming apparatus 100, the current status of this image forming apparatus 100, the status of destination selection, job processing status and the like. Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used)

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used.

The following description will be given on the configuration of this basic layout.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region (preview display region) 3000 in the center of the screen, a function settings/confirmation region 2000 on the left side of preview region 3000, an action panel region 4000 on the upper right part of preview region 3000, and a task trigger region 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles are displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically movable manner. In this case, this group of select buttons 2010 is not moved but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by dragging or sliding) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "pinch out/pinch open" is an action of spreading the two fingertips apart.

When the (−) button 3020B of zoom bar 3020 is touched, or when bar 3020C is gesture-controlled (by dragging or sliding) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking) of the document image. Further, when the document image to be displayed in preview region 3000 is large, scroll bars that can be touched or gesture-controlled may be displayed. The "flick" gesture is a soft sweeping action with the finger.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copy mode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touch-controlled, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrolling manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key(software button) 5104, a monochrome start key(software button) 5106 and a color start key(software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided region s, a copying process is effected in accordance with the request.

Next, description will be made on the switching operation of preview pages when preview region 3000 is enlarged with function selecting region 2000 displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 (FIG. 4) is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the display modes of touch panel display 130 of image forming apparatus 100 will be described with reference to the drawings.

Figure 7:
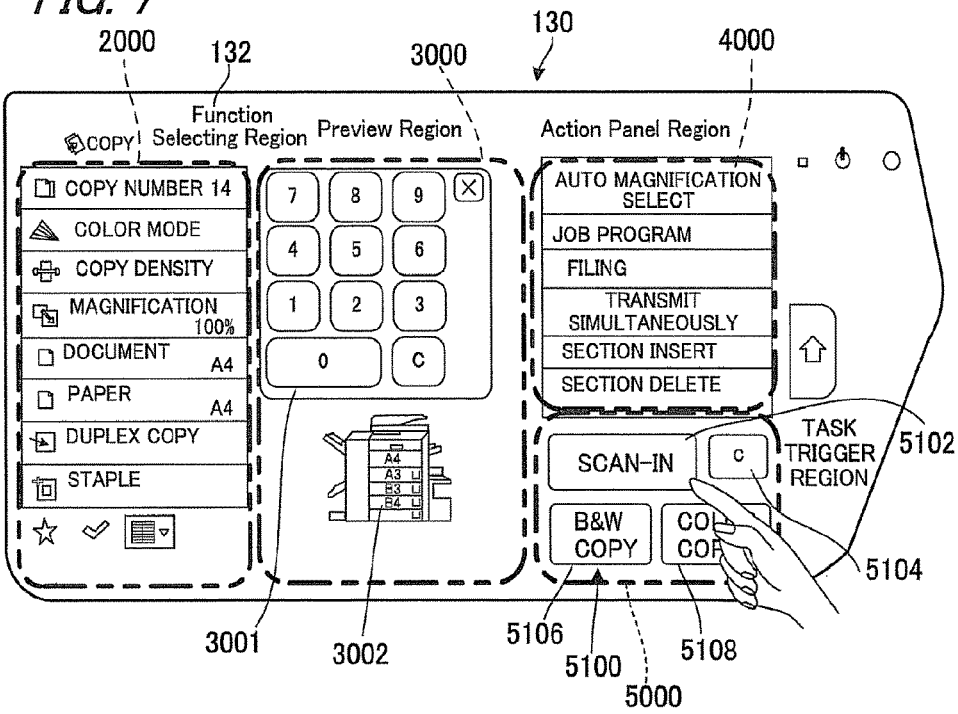
FIG. 7 is an illustrative view showing a display mode of a display panel of the touch panel display.
Figure 8:
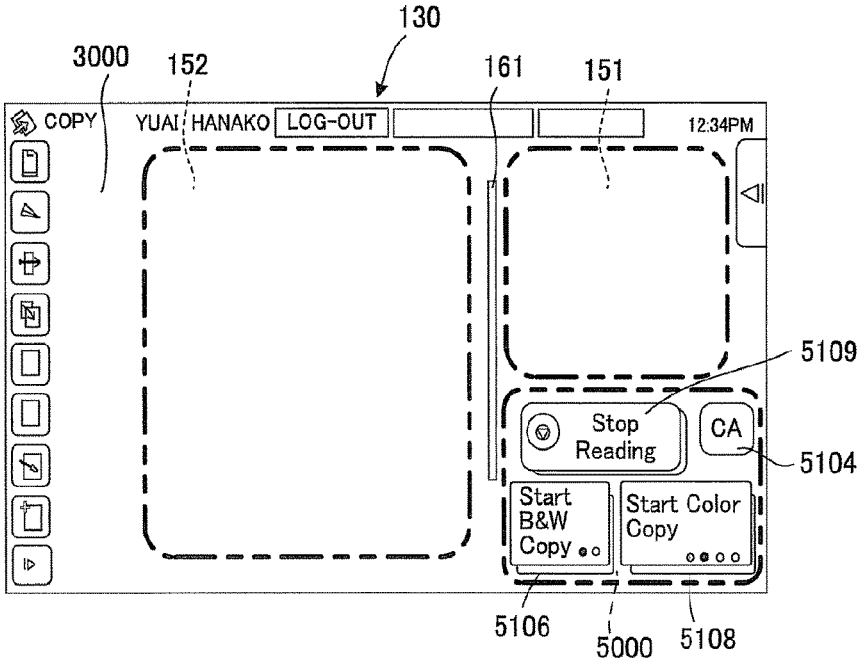
FIG. 8 is an illustrative view showing one example of a display mode of a preview display region in the touch panel display.

FIG. 7 is an illustrative view showing a display mode of the display panel of the touch panel display of the image forming apparatus. FIG. 8 is an illustrative view showing one example of a display mode of the preview display region in the touch panel display.

As shown in FIG. 7, touch panel display 130 in image forming apparatus 100, preview region 3000 is arranged in the center of the screen and function selecting region 2000 is arranged on the left side of preview region 3000. Action panel region 4000 is laid out on the upper right of preview region 3000, and task trigger region 5000 is arranged under the action panel region 4000.

Displayed in preview region 3000 of the initial screen are a virtual ten-key pad 3001 and a mimic display 3002 that gives an image of the whole apparatus.

Task trigger region 5000 is constantly displayed in the lower right of preview region 3000 without reduction in size when preview region 3000 is displayed in a large size.

Displayed in task trigger region 5000 is a group of command buttons 5100.

As the group of command buttons 5100, scan-in key 5102, clear-all key 5104, monochrome start key 5106 and color start key 5108 are laid out.

When this scan-in key 5102 is operated to scan documents and start acquisition of image data, the scan-in key may be replaced by an interrupt key for interrupting the operation of apparatus (interrupting scanning).

Further, as, shown in FIG. 8, in touch panel display 130, preview region 3000 is enlarged so that a first display area 151 is formed at the position corresponding to action panel region 4000 and a second display area 152 greater than first display area 151 is formed in the approximate center in preview region 3000.

In first display area 151, a display image generated based on the input image data is displayed.

The display image that has been displayed in first display area 151 is then displayed in second display area 152.

First display area 151 and second display area 152 are arranged side by side.

A border line 161 that shows the boundary is displayed between first display area 151 and second display area 152.

Border line 161 shows a reading line in the operation of documents being scanned when "screen display guidance" is given at the time of document reading. That is, border line 161 schematically represents the status of the documents being scanned by document reader 102, on touch panel display 130. In the present embodiment, border line 161 is displayed as a linear green line extending in the vertical direction of touch panel display 130.

Task trigger region 5000 is constantly displayed near border line 161 in the lower right of preview region 3000 without reduction in size even when preview region 3000 is enlarged.

Displayed in task trigger region 5000 is a group of command buttons 5100.

As the group of command buttons 5100, scan-in key 5102, clear-all key 5104, monochrome start key 5106 and color start key 5108 are laid out.

Monochrome start key 5106 and color start key 5108 are keys that trigger an image output process for forming (printing images) on recording paper in aftermentioned first and second output schemes.

Scan-in key 5102 is a key that triggers an aftermentioned first output scheme (a process in which, when image data has been input through document reader 102 the images are output after displaying the images to be output in a preview representation on display panel 132).

When scan-in key 5102 is operated to scan documents by scan-in direction and start acquisition of image data, the scan-in key is replaced by an interrupt key (control key) 5109 for interrupting the operation (interrupting scanning) of the apparatus, as shown in FIG. 8.

Next, the electric configuration of the control unit in the image forming apparatus will be described with reference to the drawings.

Figure 9:
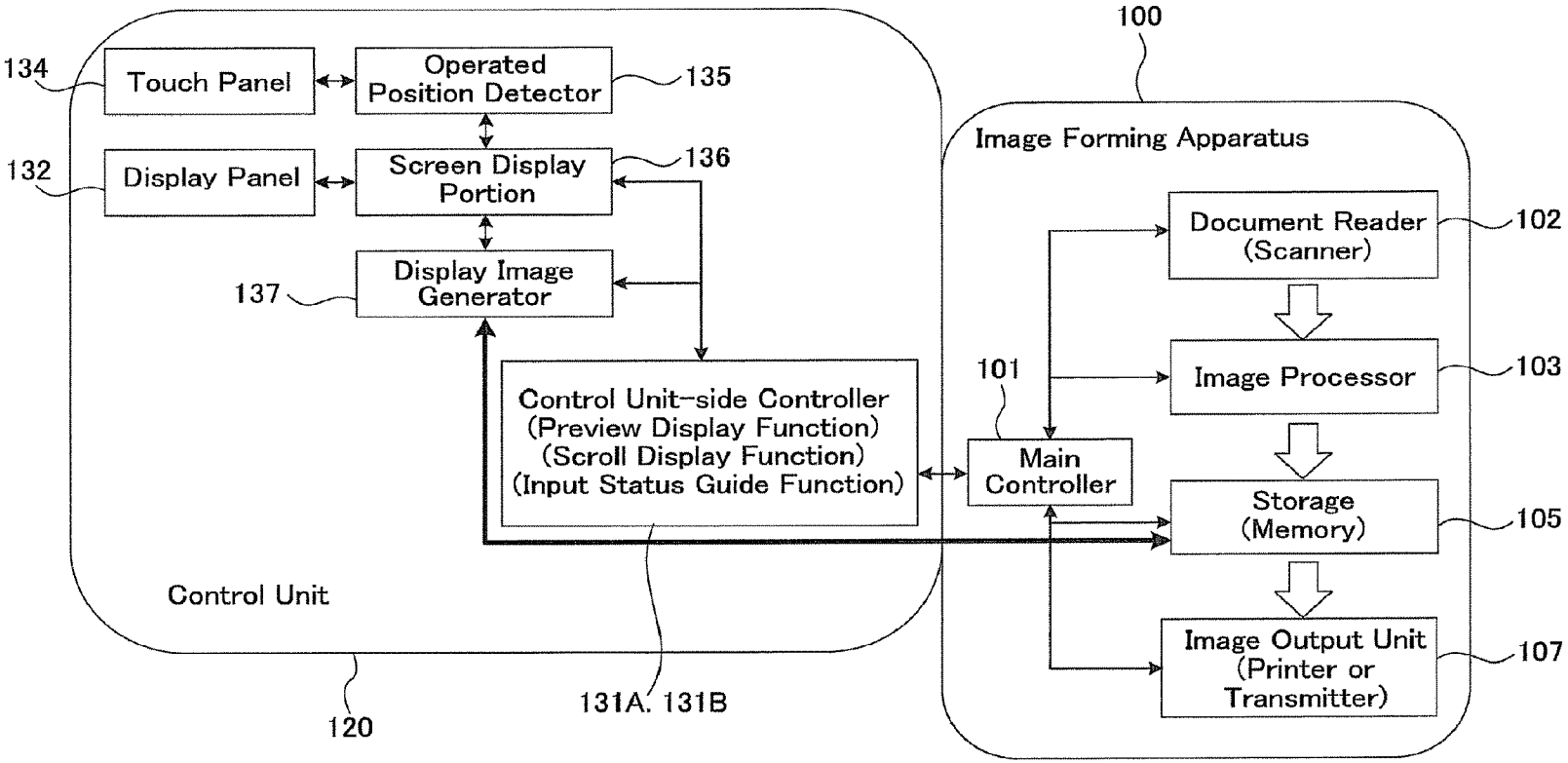
FIG. 9 is a block diagram showing an electric configuration of a control unit in the image forming apparatus.
Figure 10:
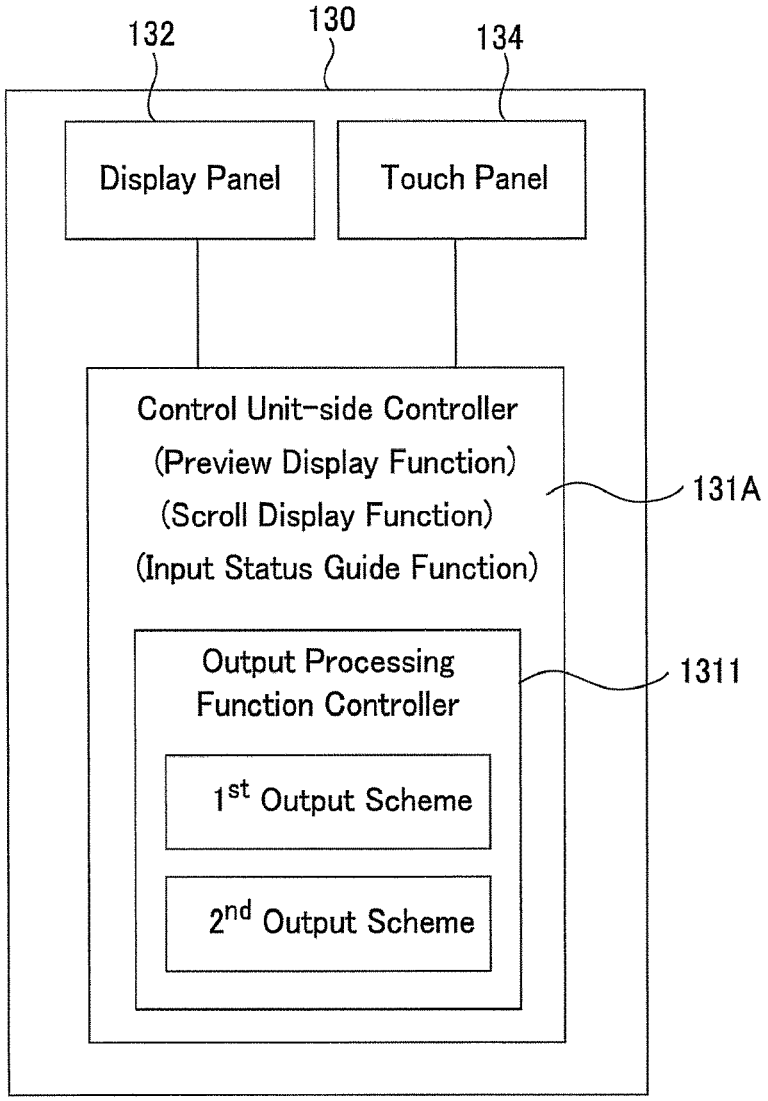
FIG. 10 is a block diagram showing a configuration of a touch panel display of a control unit according to the first embodiment of the present invention.

FIG. 9 is a block diagram showing an electric configuration of a control unit in the image forming apparatus. FIG. 10 is a block diagram showing a configuration of a touch panel display of the control unit.

As shown in FIG. 9, control unit 120 includes, in addition to display panel 132 and touch panel 134, an operated position detector 135, a screen display unit 136, a display image generator 137 and control unit-side controller (display controller) 131A for controlling the processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Operated position detector 135 detects the operated position on touch panel 134.

Screen display unit 136 displays an image formed by display image generator 137 on display panel 132.

Display image generator 137 prepares a predetermined image based on image data input to the main body of image forming apparatus 100, following instructions from control unit-side controller 131A.

Control unit-side controller 131A is connected to main controller 101 of the main body of image forming apparatus 100 and functions as a controller in touch panel display 130.

As shown in FIG. 10, control unit-side controller 131A has a preview display function for displaying multiple pages of document images in a preview representation on display panel 132, a movable display function (scroll display function) of displaying a preview of multiple page document images in a movable manner, and an input status guiding function for displaying the input status of image data input through document reader 102 on display panel 132 to guide the user.

Control unit-side controller 131A further includes an output processing function controller 1311 for controlling image output by means of image output unit 107.

Output processing function controller 1311 can control the first output scheme and the second output scheme.

The first output scheme is a process in which, when image data has been input through document reader 102, the images are output after displaying the images to be output in a preview representation on display panel 132.

The second output scheme is a process in which, when image data has been input through document reader 102, the image is directly output without displaying the image to be output in a preview representation on display panel 132.

The user is allowed to select either the first output scheme or the second output scheme.

In the output processing by image output unit 107, an identical display is displayed as the standby screens to be displayed on display panel 132 to direct the start of an output process, for both the first output scheme and the second output scheme.

In the output processing by image output unit 107, the operations after an output start command is given are different between the first output scheme and second output scheme.

Next, the image output processing by image output unit 107 (the first output scheme and the second output scheme) will be described with reference to flow charts.

Figure 11:
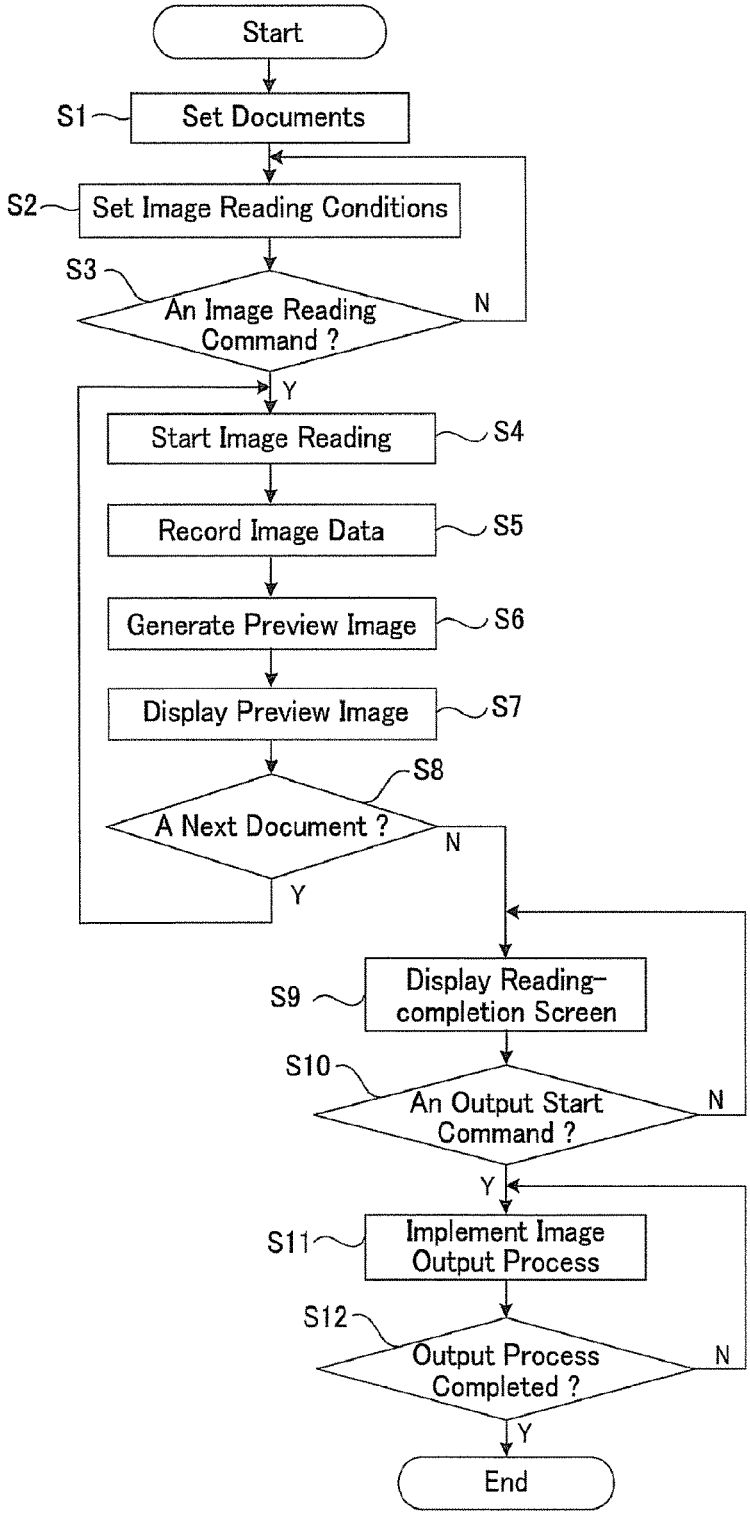
FIG. 11 is a flow chart showing the processing sequence of the first output scheme implemented by an image output unit of the image forming apparatus.
Figure 12:
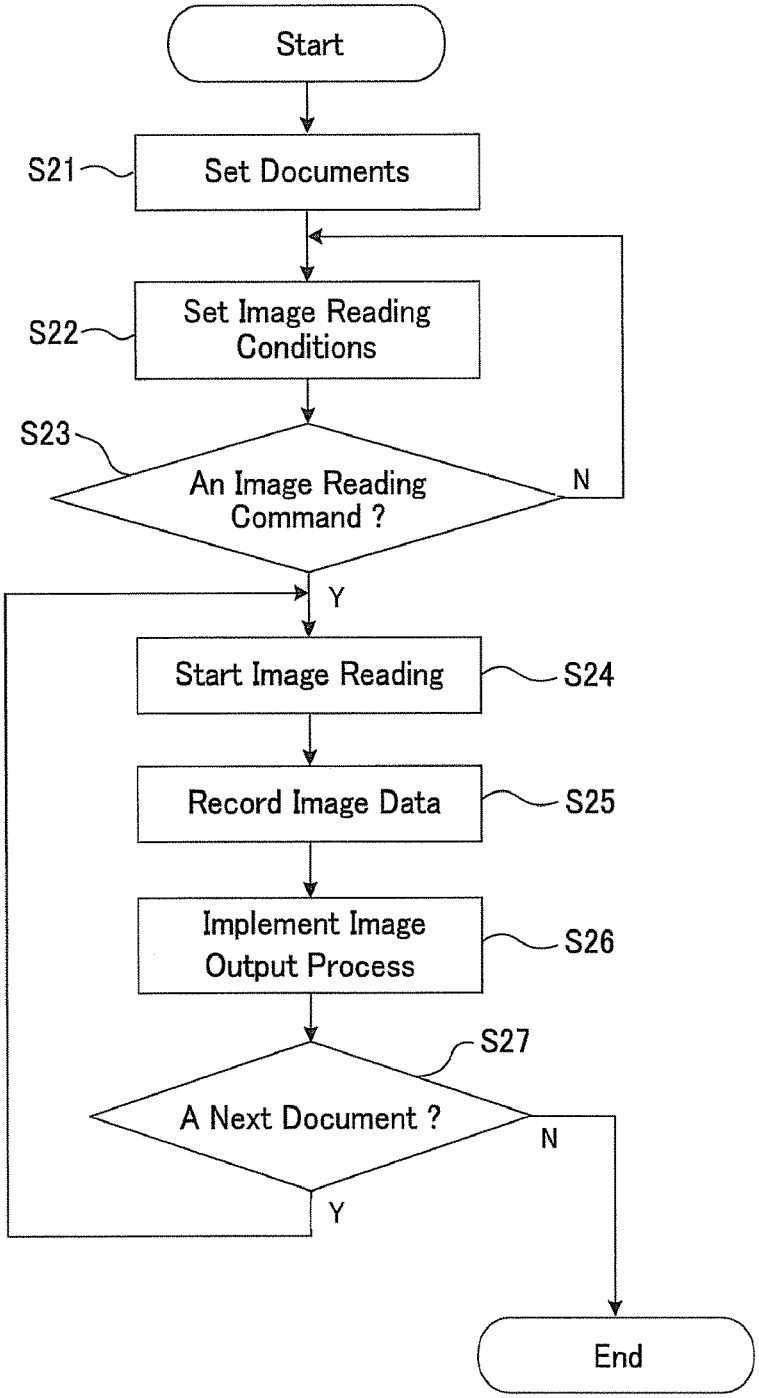
FIG. 12 is a flow chart showing the processing sequence of the second output scheme implemented by the image output unit.

FIG. 11 is a flow chart showing the processing sequence of the first output scheme. FIG. 12 is a flow chart showing the processing sequence of the second output scheme.

Image output by means of image output unit 107 can be carried out by two ways, i.e., based on the first output scheme and the second output scheme, one of which is selected by the user.

(The First Output Scheme)

The first output scheme in image forming apparatus 100 is a process in which, when image data has been input through document reader 102 the images are output after displaying the images to be output in a preview representation on display panel 132.

In image forming apparatus 100, when the first output scheme is selected to make image output unit 107 perform image output, the output process shown in FIG. 11 is effected.

First, documents are set on document reader 102 (Step S1) and the conditions for image reading are set on touch panel display 130 (Step S2). After completion of setting the conditions for image reading, it is determined whether the start of document reading is directed by touching scan-in key 5102 (Step S3).

When it is determined at Step S3 that the start of document reading has been directed, document reading by document reader 102 is started (Step S4).

On the other hand, when it is determined at Step S3 that the start of document reading has not been directed, the control returns to Step S2, and the conditions for image reading are set once again.

As document reading is performed at Step S4, the image data of the read document is recorded into storage 105 (Step S5).

Then, a display image to be given in a preview representation is generated based on the recorded image data by display image generator 137 (Step S6), and the display image is given in a preview representation on display panel 132 (Step S7).

Thereafter, it is determined whether there is a next document (Step S8).

When it is determined at Step S8 that there is a next document, the control returns to Step S4 so that document reading is carried out. On the other hand, when it is determined at Step S8 that there is no more document, a display image for notifying a completed state of document reading is given (Step S9).

Then, the control enters a mode for waiting for an image output command, in which it is checked whether the start of image output is directed by touching monochrome start key 5106 or color start key 5108 (Step S10).

When it is determined at Step S10 that an image output start command has been given, an image output process is implemented (Step S11).

On the other hand, when it is determined at Step S10 that no command for starting image output has been given, the control goes back to Step S9, and the display image indicating a completed state of document reading is displayed to wait for an image output command.

When an image output process is implemented at Step S11, then it is determined whether the image output process is completed (Step S12). When it is determined at Step S12 that the image output process has been completed, the image output process is ended. On the other hand, when it is not determined at Step S12 that the image output process has been completed, the control returns to Step S11, so that the image output process is continued.

In this way, the first output scheme is implemented.

In the above way, according to the first output scheme, image data of each document scanned by image reader 102 is recorded into storage 105 first so that display images based on the image data is presented in a preview representation, thereafter, image output is carried out. Accordingly, it is possible to implement image output without making mistakes.

(The Second Output Scheme)

The second output scheme in image forming apparatus 100 is a process in which, when image data has been input through document reader 102 the image is directly output without displaying the image to be output in a preview representation on display panel 132.

In image forming apparatus 100, when the second output scheme is selected to make image output unit 107 perform image output, the output process shown in FIG. 12 is effected.

First, documents are set on document reader 102 (Step S21) and the conditions for image reading are set on touch panel display 130 (Step S22). After completion of setting the conditions for image reading, it is determined whether the start of document reading by touching either monochrome start key 5106 or color start key 5108 is directed (Step S23).

When it is determined at Step S23 that the start of document reading has been directed, document reading by document reader 102 is started (Step S24).

On the other hand, when it is determined at Step S23 that the start of document reading has not been directed, the control returns to Step S22, and the conditions for image reading are set once again.

As document reading is performed at Step S24, the image data of the read document is recorded into storage 105 (Step S25). Then, an image output process is implemented based on the recorded image data (Step S26).

Thereafter, it is determined whether there is a next document (Step S27).

When it is determined at Step S27 that there is another document, the control returns to Step S24 so that document reading is carried out. On the other hand, when it is determined at Step S27 that there is no more document, the image output process is ended.

In this way, the second output scheme is implemented.

In the above way, according to the second output scheme, image data of each document scanned by image reader 102 is recorded into storage 105 first, then the image is directly output without presenting any preview display. Accordingly, it is possible to perform image output quickly as compared to the first output scheme.

That is, in the first output scheme, image output is effected at the eleventh step in the processing sequence shown in FIG. 11, whereas in the second output scheme, image output is implemented at the sixth step in the processing sequence shown in FIG. 12. Accordingly, when the user wants to have an output process finished in a hurry, it is possible to effect an image output process quickly by selecting the second output scheme which does not produce preview display.

Referring next to the drawings, the preview display given to guide the document reading status by document reader 102 on touch panel display 130 will be described.

FIGS. 13 to 22 are illustrative views showing the progress of preview images displayed on the touch panel display at the time of document reading in the image forming apparatus of the present embodiment.

Figure 13:
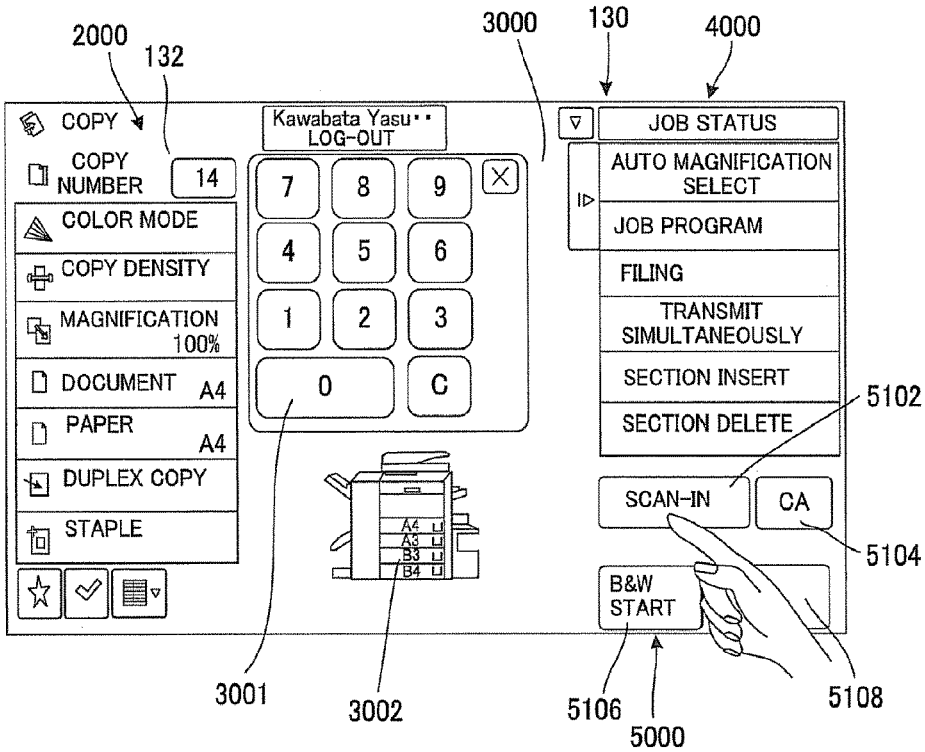
FIG. 13 is an illustrative view showing a display mode of the touch panel display at the time of document reading.

In image forming apparatus 100, when documents to be copied are read, the user selects the copy mode in the home screen displayed on touch panel display 130, and a screen shown in FIG. 13 is displayed on touch panel display 130. Under this condition, in order to perform preview display (the first output scheme), the user touches scan-in key 5102 as shown in FIG. 13 to start document reading.

The set documents are assumed to be A4 size documents in long-edge-feed orientation, for example.

Figure 14:
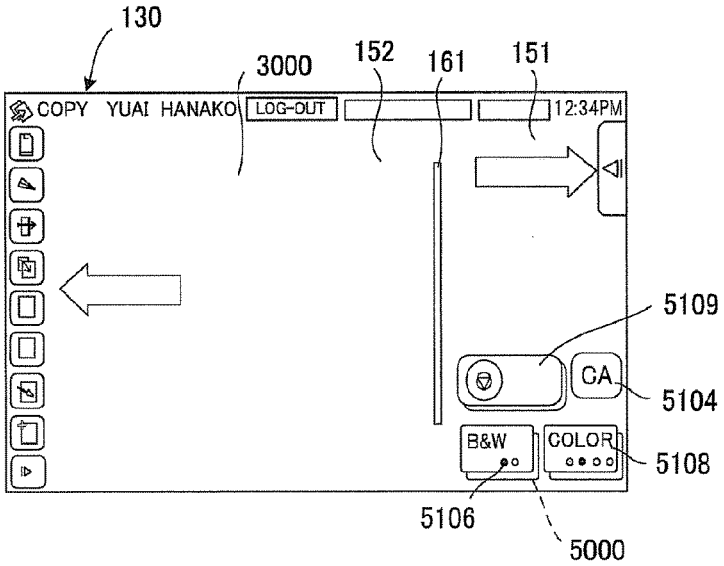
FIG. 14 is an illustrative view showing a displayed state on the touch panel display at the start of document reading.

When document reading is directed through scan-in key 5102, the displayed information in function selecting region 2000 and action panel region 4000 on touch panel display 130 is pulled in to both the left and right sides indicated by the arrows in FIG. 14 while preview region 3000 is expanded and border line 161 indicating the boundary between first display area 151 and second display area 152 formed in preview region 3000 is displayed.

This border line 161 is to schematically represent the status of documents being scanned by document reader 102, on touch panel display 130, and will be referred to as "reading line".

Figure 15:
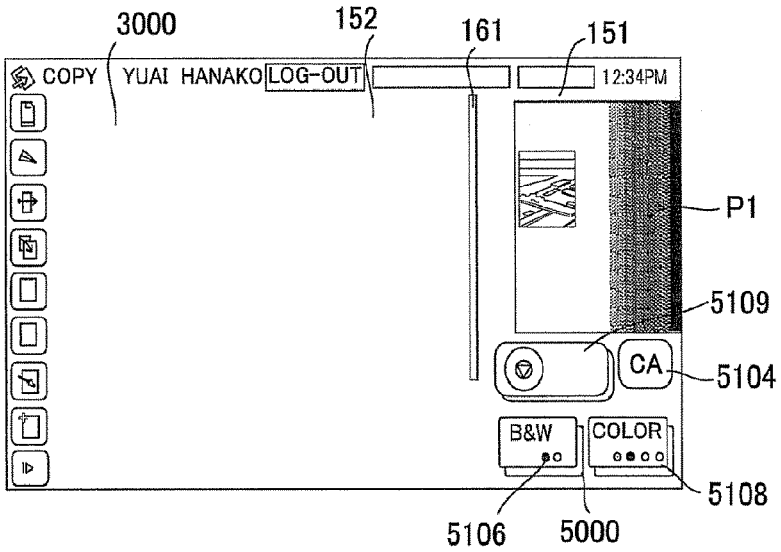
FIG. 15 is an illustrative view showing a state where the image of the first document is displayed in the first display area on the touch panel display.

When documents are read by document reader 102, a preview image reduced in size by display image generator 137 is formed from the image data of the first scanned document, and the first sheet image P1 is displayed in first display area 151 on the right side of reading line 161, as shown in FIG. 15.

The first sheet image P1 is displayed so as to gradually become clearer toward second display area 152 or reading line 161 (from right to left).

Figure 16:
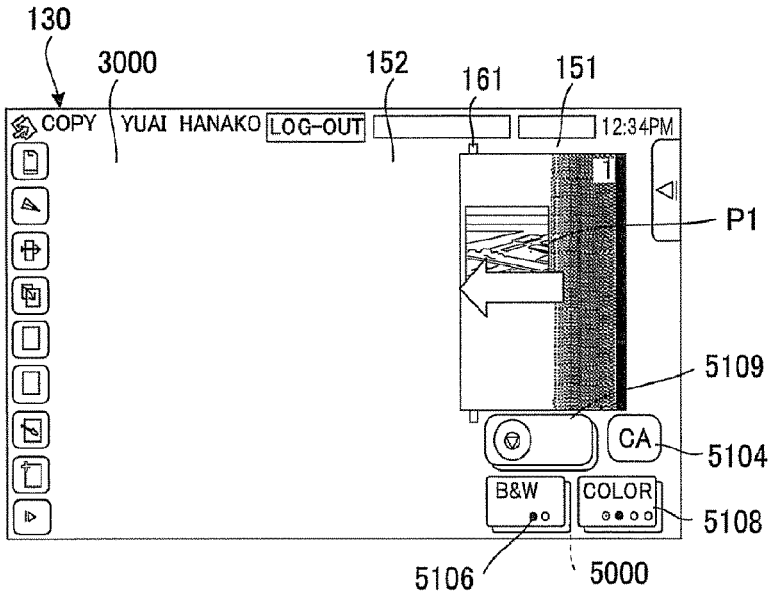
FIG. 16 is an illustrative view showing a state where the first sheet image is moving from the first display area to the second display area on the touch panel display.
Figure 17:
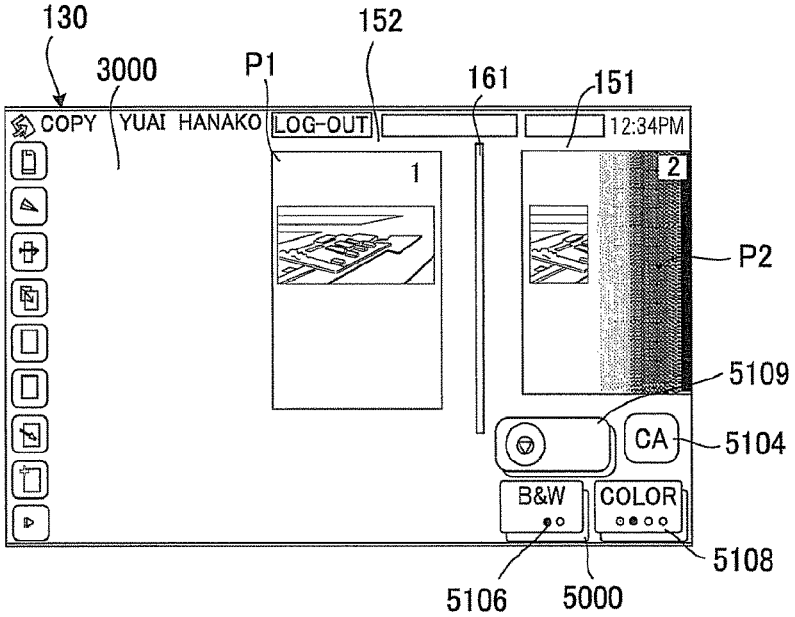
FIG. 17 is an illustrative view showing a state where the second sheet image is displayed in the first display area after the first sheet image has been moved from the first display area to the second display area on the touch panel display.

The first sheet image P1 displayed in first display area 151 moves toward reading line 161 as shown in FIG. 16 and passes over reading line 161 to second display area 152 on the left side of reading line 161 as shown in FIG. 17.

At this point of time, the second sheet image P2 which display image generator 137 formed based on the image data of the second sheet document scanned by document reader 102 is reduced in size and displayed in first display area 151.

The second sheet image P2 displayed in first display area 151 is displayed so that the image becomes gradually clearer toward second display area 152 or reading line 161 (from right to left).

Figure 18:
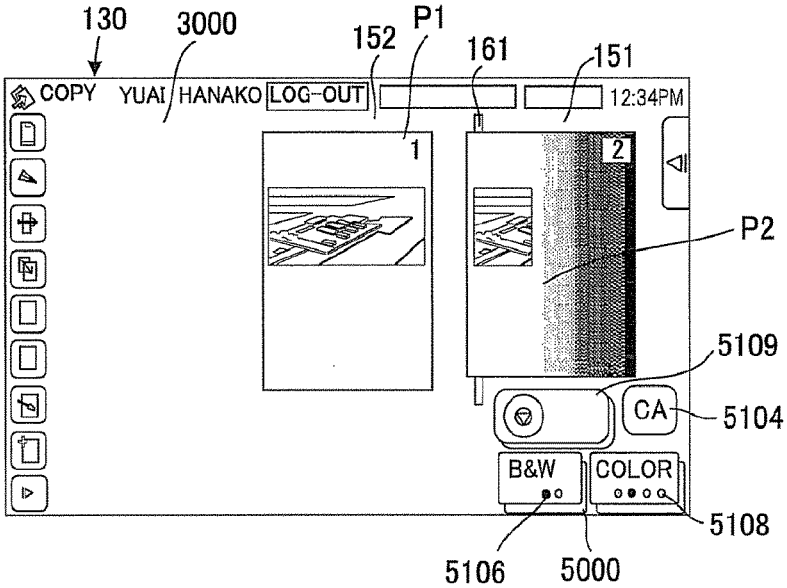
FIG. 18 is an illustrative view showing a state where the second sheet image is moving from the first display area to the second display area on the touch panel display.
Figure 19:
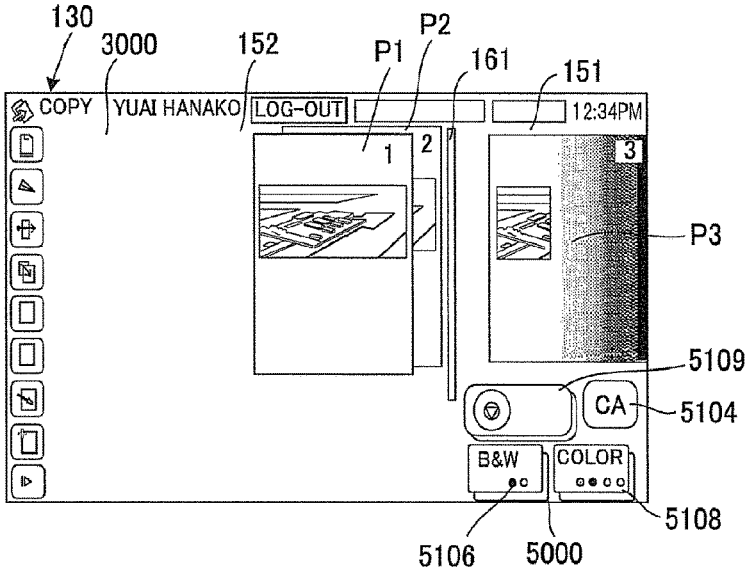
FIG. 19 is an illustrative view showing a state where the second sheet image has moved to and behind the first sheet image in the second display area on the touch panel display.

Then, the second sheet image P2 displayed in first display area 151 moves toward reading line 161 as shown in FIG. 18 and passes over reading line 161 to second display area 152 on the left side of reading line 161, where the image is displayed as shown in FIG. 19.

At this point, the second sheet image P2 is laid behind first sheet image P1 with part of it exposed from the first sheet image P1 so as to have the existence of second sheet image P2 recognized.

Then, at this point of time, the third sheet image P3 which display image generator 137 formed based on the image data of the third sheet document scanned by document reader 102, is reduced in size and displayed.

That is, the third sheet image P3 displayed in first display area 151 is displayed so that the image becomes gradually clearer toward second display area 152 or reading line 161 (from right to left).

Figure 20:
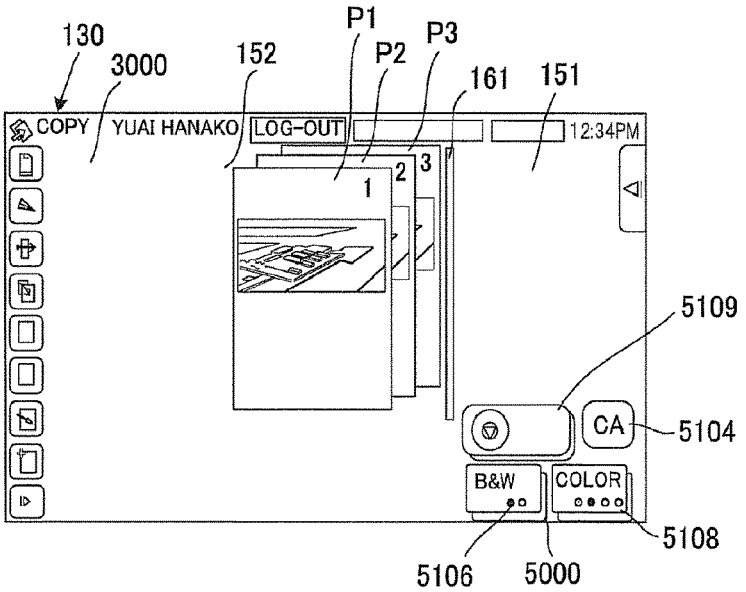
FIG. 20 is an illustrative view showing a state where the third sheet image has moved to and behind the second sheet image that moved and is displayed in the second display area on the touch panel display.

Then, third sheet image P3 displayed in first display area 151 moves toward reading line 161 as shown in FIG. 20 and passes over reading line 161 to second display area 152 on the left side of reading line 161, where the image is displayed.

At this point, the third sheet image P3 is further laid behind second sheet image P2 with part of it exposed from the second sheet image P2 so as to have the existence of third sheet image P3 recognized.

Figure 21:
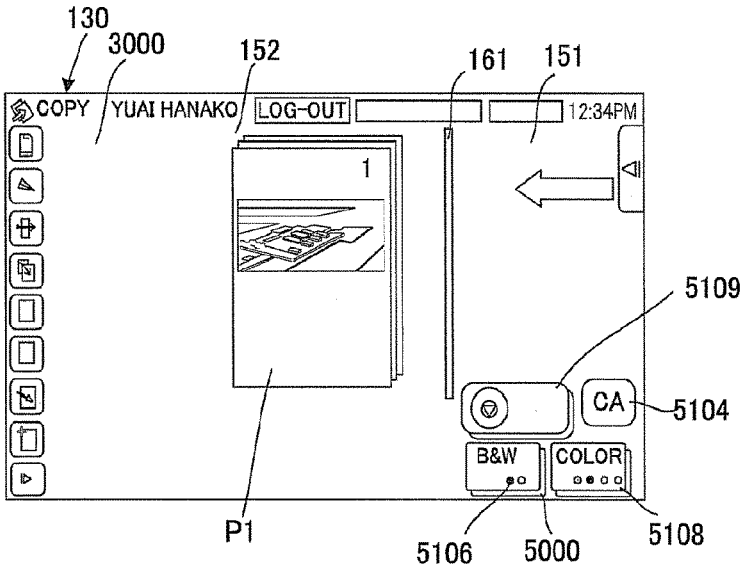
FIG. 21 is an illustrative view showing a displayed state of the touch panel display immediately after all the documents have been pre-scanned by scan-in in the image forming apparatus.
Figure 22:
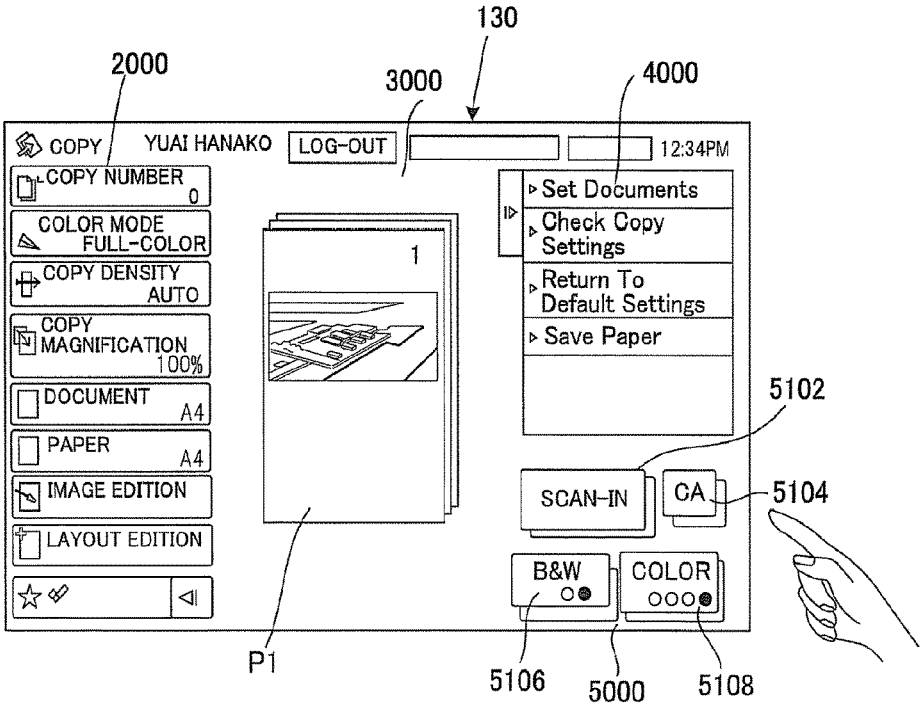
FIG. 22 is an illustrative view showing a displayed state of the touch panel display in command waiting mode after all the documents were pre-scanned by scan-in in the image forming apparatus.

When display and motion of the display image of each document scanned by document reader 102 is repeatedly performed as described above so that pre-scanning of all the documents by scan-in is completed as shown in FIG. 21, display of function selecting region 2000 and action panel region 4000 is restored to the original state while reading line 161 is deleted as shown in FIG. 22. The display image in this state after scanning of the documents is completed, forms the standby screen for starting an output process.

Next, the control of executing image output through touch panel display 130 will be described with reference to the drawings.

Figure 23:
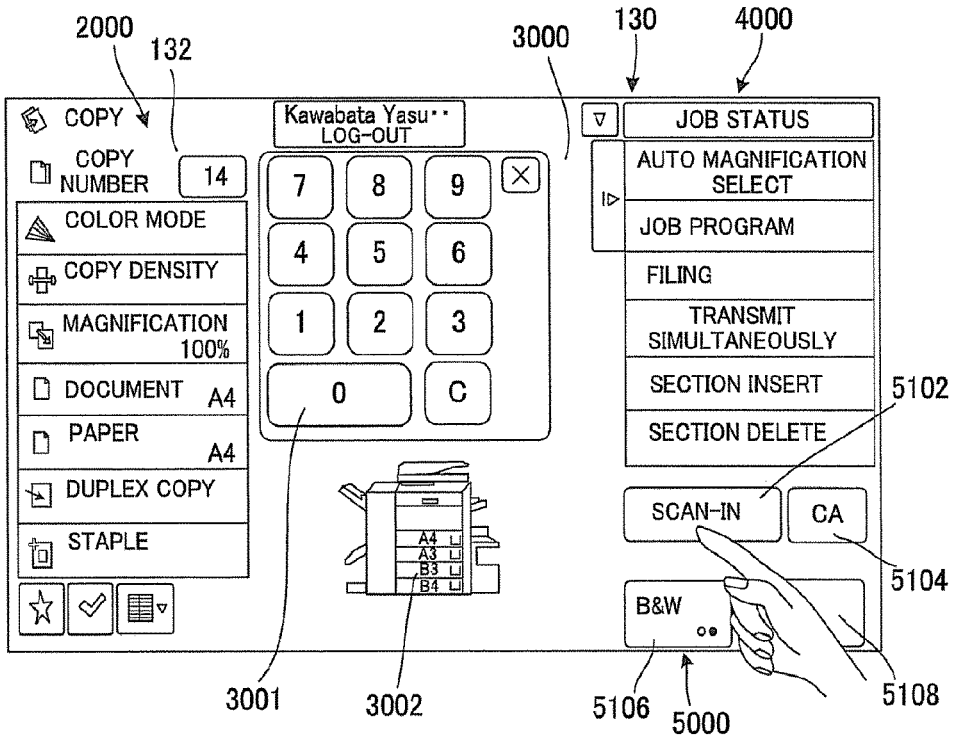
FIG. 23 is an illustrative view showing a display screen for directing the start of image reading by the first output scheme in the image output unit of the image forming apparatus.
Figure 24:
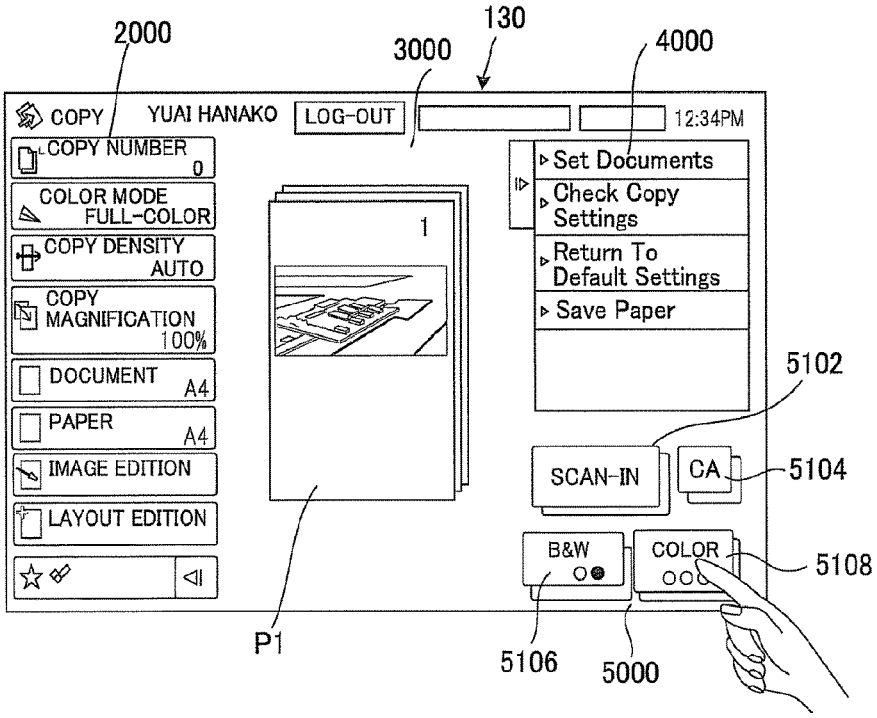
FIG. 24 is an illustrative view showing a display screen for directing the start of image output by the first output scheme in the image output unit.
Figure 25:
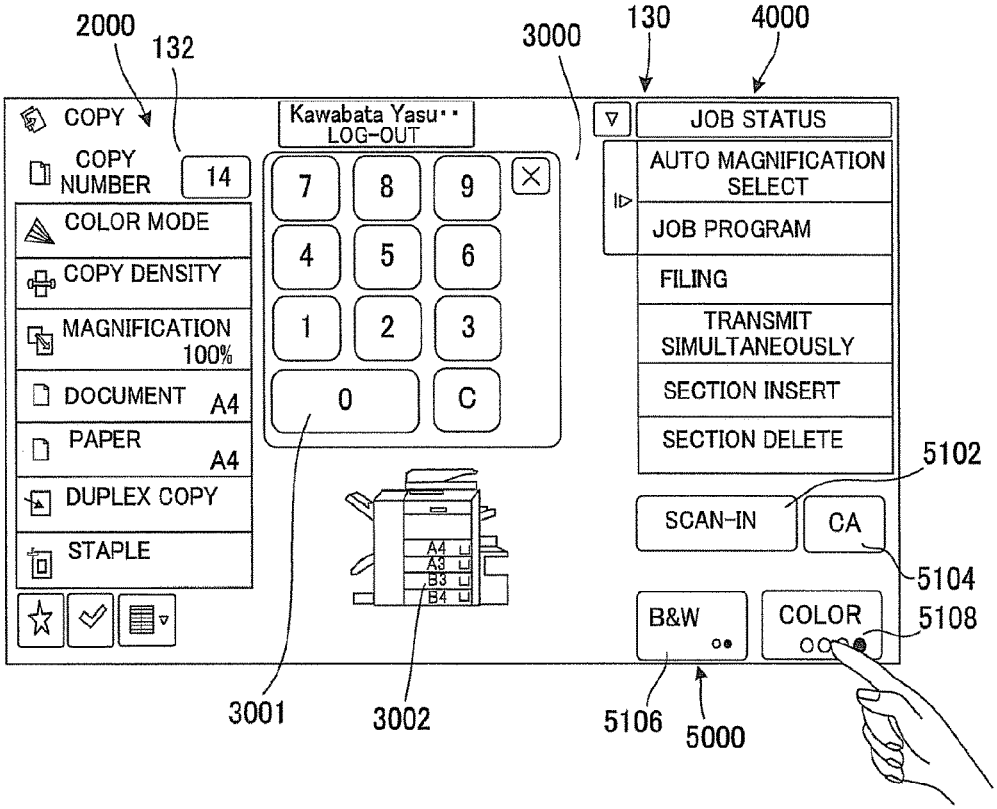
FIG. 25 is an illustrative view showing a display screen for directing the start of image output by the second output scheme in the image output unit.

FIG. 23 is an illustrative view showing a display screen for directing the start of image reading by the first output scheme in the image output unit of the image forming apparatus. FIG. 24 is an illustrative view showing a display screen for directing the start of image output by the first output scheme in the image output unit. FIG. 25 is an illustrative view showing a display screen for directing the start of image output by the second output scheme in the image output unit.

When image output is carried out by image output unit 107, either the first output scheme or the second output scheme is selected by the user and effected.

(The First Output Scheme)

When image output is performed based on the first output scheme in image forming apparatus 100, the first output scheme is selected for the output process by touching scan-in key 5102 in the copy mode initial screen as shown in FIG. 23 to thereby start document reading.

When document reading is started in the first output scheme, preview images shown in FIGS. 14 to 22 are displayed based on the image data of the scanned documents. Then when all the documents have been scanned, the standby screen with the images to be output displayed in a preview representation is presented as shown in FIG. 24 and the control enters the command waiting mode for starting an image output process.

Then, to start image output, monochrome start key 5106 or color start key 5108 on the standby screen shown in FIG. 24 is touched to direct the start of image output.

As described above, according to the first output scheme, since the display images based on the scanned image data are preview-displayed and then the output process is implemented by giving an image output start command, it is possible to perform an output process by confirming the output content in advance based on preview images when the user puts weight on the finished condition and hence perform image output without making mistakes.

In the display image displayed on display panel 132 in the first output scheme, either the copy mode initial screen shown in FIG. 23 or the standby screen for starting an image output process shown in FIG. 24, function selecting region 2000, action panel region 4000 and task trigger region 5000 are displayed. Further, in task trigger region 5000, scan-in key 5102 and color start key 5108 are displayed in the same manner for both of the display screens. With this arrangement, the user can start a document reading operation or an image output operation without confusion when image output is performed by the first output scheme.

(The Second Output Scheme)

When image output is performed by the second output scheme in image forming apparatus 100, the second output scheme is selected as an output process by touching monochrome start key 5106 or color start key 5108 in the copy mode initial screen as shown in FIG. 25 so as to start document reading.

When document reading is started in the second output scheme, the image data of the scanned document is recorded into storage 105, then images are directly output based on the image data without presenting any preview display.

As described above, since the second output scheme includes no processing steps for presenting preview display, it is possible to perform image output quickly.

Further, similarly to the display screen in the first output scheme, the display image displayed on display panel 132 in the second output scheme includes function selecting region 2000, action panel region 4000 and task trigger region 5000 as shown in FIG. 25. Further, in task trigger region 5000, monochrome start key 5106 and color start key 5108 are displayed in the same manner as the standby screen for starting an image output process in the first output scheme shown in FIG. 24. With this arrangement, the user can start an image output operation without confusion when image output is performed by the second output scheme.

As described above, according to the present embodiment, in image forming apparatus 100, control unit-side controller 131A includes output processing function controller 1311 which effects the first output scheme in which, when image data has been input through document reader 102, the images are output after displaying the images to be output in a preview representation on display panel 132 and the second output scheme in which, when image data has been input through document reader 102, the image is directly output without displaying the image to be output in a preview representation on display panel 132. Accordingly, two types of output schemes are made possible so as to implement an output process in conformity with user's intention, whereby it is possible to meet user needs.

For example, when the user puts weight on the finished condition, use of the first output scheme enables the user to check the output content by preview images in advance before performing an output process, it is hence possible to perform image output without making mistakes.

On the other hand, when the user puts weight on quickness of output processing, use of the second output scheme enables a direct output process for the input data without presenting any preview display, it is hence possible to produce quick image output.

In the present invention, it is possible to switch the processing mode from the first output scheme to the second output scheme in the middle of presenting preview display (the first output scheme) Next, description will be made on the second embodiment in which the processing mode can be switched from the first output scheme to the second output scheme in the middle of the former.

(The Second Embodiment)

The second embodiment of the present invention will be described with reference to FIGS. 26 to 41. Since the second embodiment is different from the first embodiment in the configuration of the control unit-side controller only, description will be made focusing on the different points of the control unit-side controller. Further, in the following description, the same components as those in the first embodiment are allotted with the same reference numerals without description.

Figure 26:
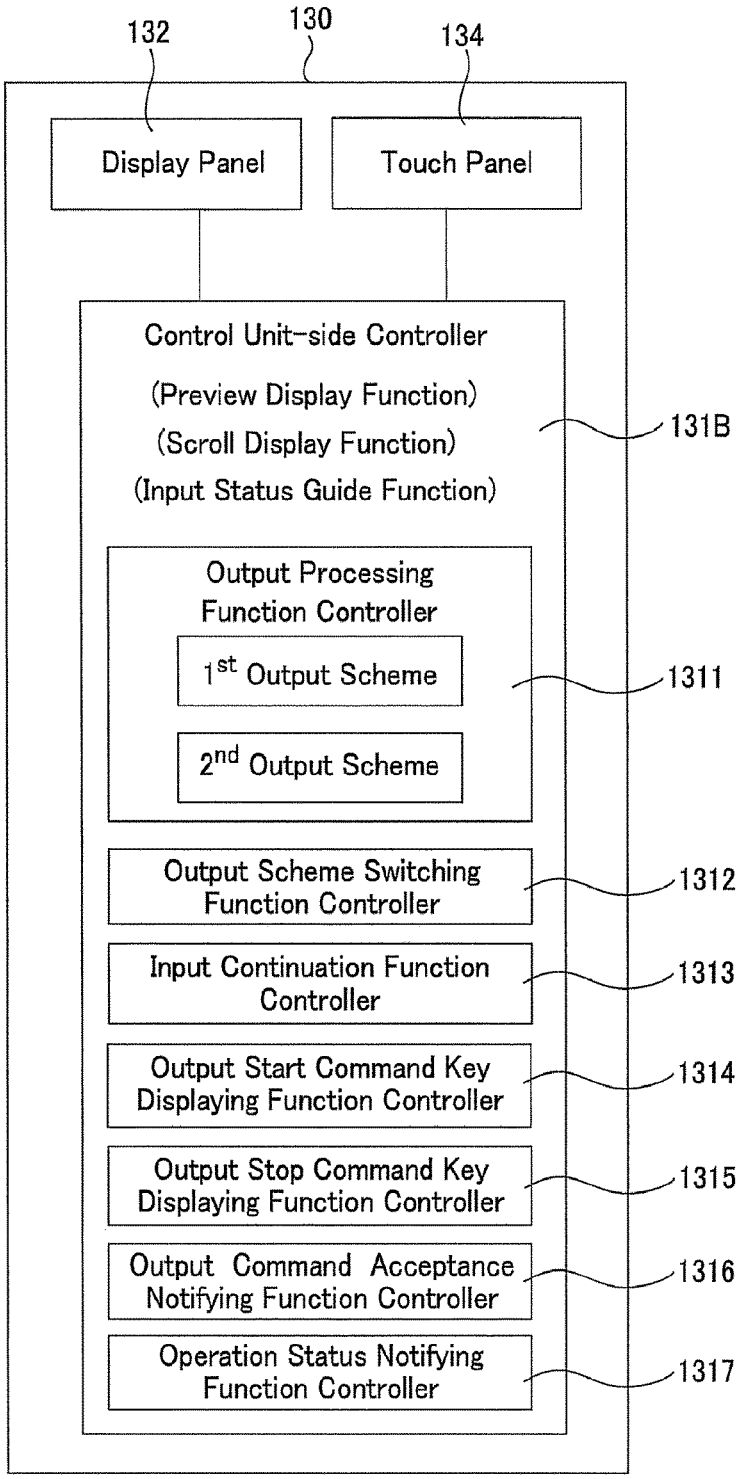
FIG. 26 is a block diagram showing a configuration of a touch panel display of a control unit according to the second embodiment of the present invention.

As shown in FIG. 26, control unit-side controller 131B of the present embodiment has a preview display function for displaying multiple pages of document images in a preview representation on display panel 132, a movable display function of displaying a preview of multiple page document images in a movable manner, and an input status guiding function for displaying the input status of image data input through document reader 102 on display panel 132 to guide the user.

Control unit-side controller 131B further includes an output processing function controller 1311 for controlling image output by means of image output unit 107.

Output processing function controller 1311 is able to control the first output scheme in which, when image data has been input through document reader 102, the images are output after displaying the images to be output in a preview representation on display panel 132 and the second output scheme in which, when image data has been input through document reader 102, the image is directly output without displaying the image to be output in a preview representation on display panel 132.

The user is allowed to select either the first output scheme or the second output scheme.

Control unit-side controller 131B further includes an output scheme switching function controller 1312, an input continuation function controller 1313, an output start command key displaying function controller 1314, an output stop command key displaying function controller 1315, an output command acceptance notifying function controller 1316, and an operation status notifying function controller 1317.

Output scheme switching function controller 1312 performs such control as to stop preview display and actuate the second output scheme to start image output when the start of image output by means of image output unit 107 is directed (by a touching operation of monochrome start key 5106 or color start key 5108) during the output process of the first output scheme.

Input continuation function controller 1313 performs such control as to start image output of the image data that has been already input and continue input of image data that has not yet been input when the start of image output by means of image output unit 107 is directed (by a touching operation of monochrome start key 5106 or color start key 5108) during the output operation of the first output scheme.

Output start command key displaying function controller 1314 performs such control as to display the output start command keys (monochrome start key 5106 and color start key 5108) for instructing the start of image output by means of image output unit 107, on touch panel display 130 during the output operation of the first output scheme.

Output stop command key displaying function controller 1315 performs such control as to display the output stop command keys for instructing the stoppage of image output until image data that has not been yet input ends when the start of image output by means of image output unit 107 is directed (by a touching operation of monochrome start key 5106 or color start key 5108) during the output operation of the first output scheme.

Output command acceptance notifying function controller 1316 performs such control as to notify that the start of image output by means of image output unit 107 can be directed during the output operation of the first output scheme.

Operation status notifying function controller 1317 performs such control as to notify the operation status of the apparatus during the output operation of the first output scheme when the start of image output by means of image output unit 107 is directed (by a touching operation of monochrome start key 5106 or color start key 5108).

The components of control unit-side controller 131B, specifically, output processing function controller 1311, output scheme switching function controller 1312, input continuation function controller 1313, output start command key displaying function controller 1314, output stop command key displaying function controller 1315, output command acceptance notifying function controller 1316 and operation status notifying function controller 1317, may be provided separately so that each controller performs its function (control), may be provided as an integrated structure that can perform the functions (control) of all the controllers, or may be provided as multiple structures each of which includes two or more controllers in combination.

Next, the output process by means of image output unit 107 in image forming apparatus 100 will be described with reference to flow charts.

Figure 27:
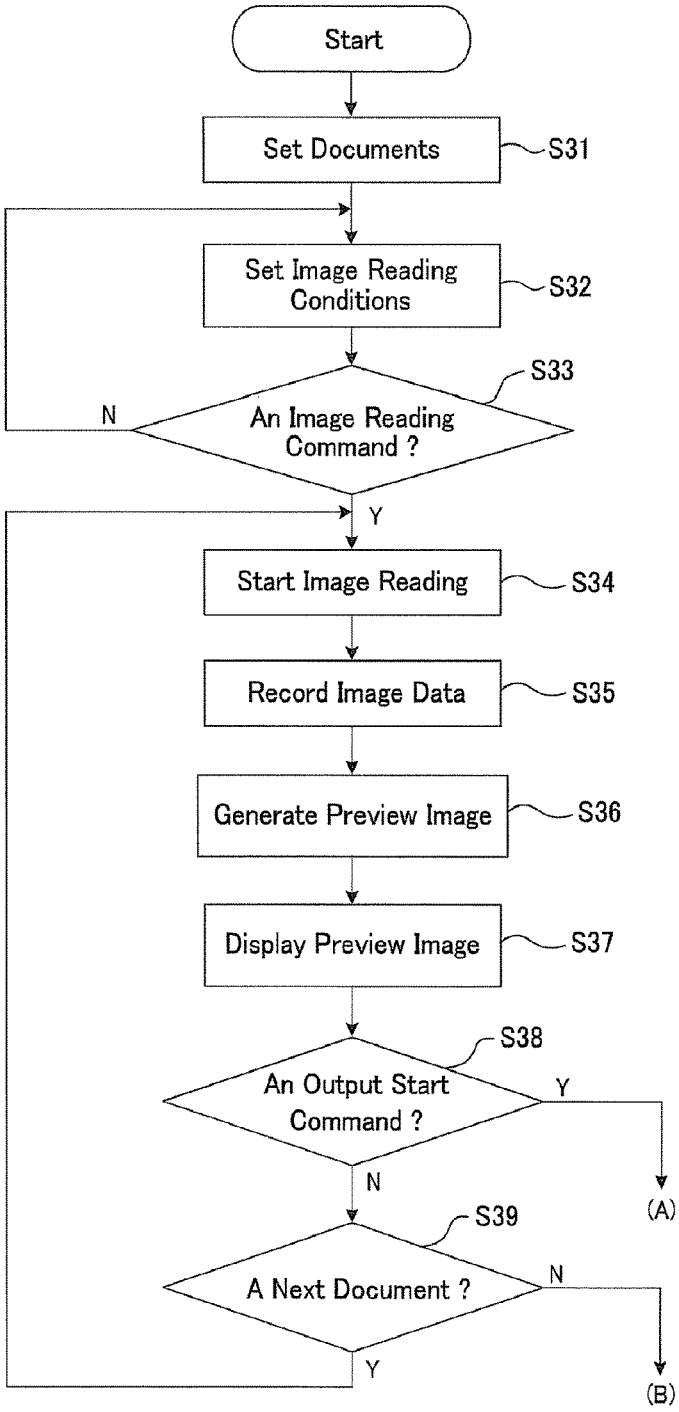
FIG. 27 is a flow chart showing the processing sequence of performing image output when input of image data is implemented by the first output scheme in the image forming apparatus.
Figure 28:
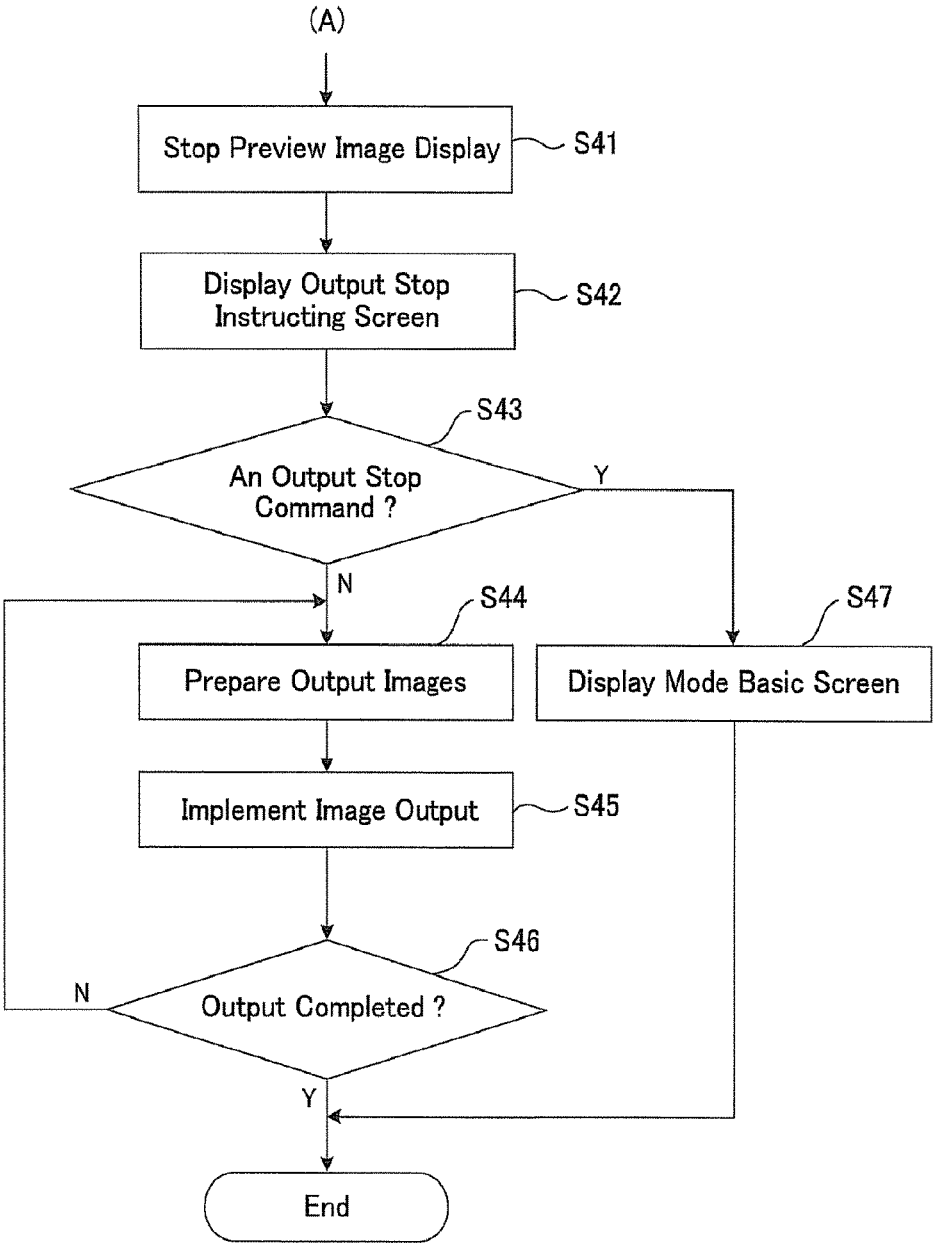
FIG. 28 is a flow chart showing the processing sequence of an output process when an output start command is given in the middle of capturing image data in the first output scheme in the image forming apparatus.
Figure 29:
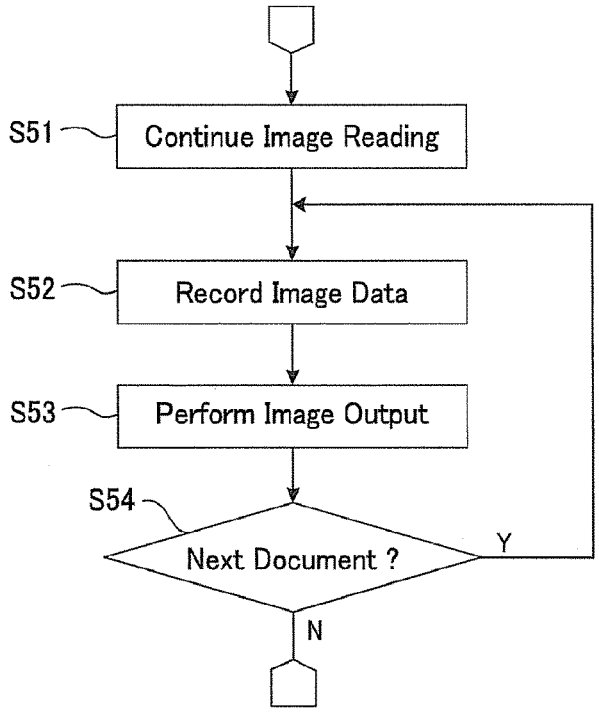
FIG. 29 is a flow chart showing the processing sequence of an input process of image data that is continued in parallel with the output process when an output start command is given in the middle of capturing image data in the first output scheme in the image forming apparatus.
Figure 30:
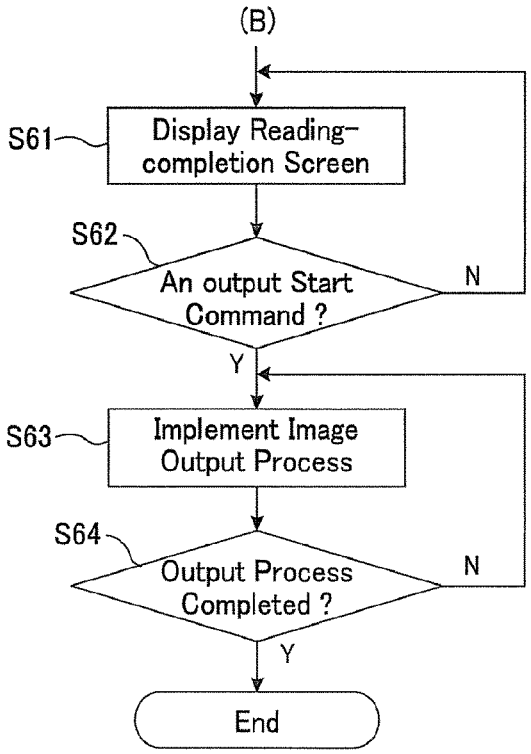
FIG. 30 is a flow chart showing the processing sequence of an output process when no output start command is given in the middle of capturing image data in the first output scheme in the image forming apparatus.

FIG. 27 is a flow chart showing the processing sequence of performing image output when input of image data is implemented by the first output scheme in the image forming apparatus. FIG. 28 is a flow chart showing the processing sequence of an output process when an output start command is given in the middle of capturing image data in the first output scheme. FIG. 29 is a flowchart showing the processing sequence of an input process of image data that is continued in parallel with the output process when an output start command is given in the middle of capturing image data in the first output scheme. FIG. 30 is a flowchart showing the processing sequence of an output process when no output start command is given in the middle of capturing image data in the first output scheme.

Image output by means of image output unit 107 can be performed by two ways, i.e., based on the first and second output schemes, one of which is selected by the user.

In the output processing in the image forming apparatus, when the so-called scan-in preview, which presents input image data on touch panel display 130 in a preview representation before output, is used, the output process is implemented by selecting the first output scheme.

In image forming apparatus 100, when the first output scheme is selected to output the images of the input image data by means of image output unit 107, the output process shown in FIG. 27 is implemented.

First, documents are set on document reader 102 (Step S31) and the conditions for image reading are set on touch panel display 130 (Step S32). After completion of setting the conditions for image reading, it is determined whether the start of document reading is directed by touching scan-in key 5102 (Step S33).

When it is determined at Step S33 that the start of document reading has been directed, document reading by document reader 102 is started (Step S34). At this point, output start command keys (monochrome start key 5106 and color start key 5108) for directing the start of image output are displayed on touch panel display 130 by output start command key displaying function controller 1314.

On the other hand, when it is determined at Step S33 that the start of document reading has not been directed, the control returns to Step S32, and the conditions for image reading are set once again.

As document reading is performed at Step S34, the image data of the read document is recorded into storage 105 (Step S35).

Then, a display image to be given in a preview representation is generated based on the recorded image data by display image generator 137 (Step S36), and the display image is given in a preview representation on display panel 132 (Step S37).

Thereafter, it is determined whether an output start command has been given in the middle of scan-in preview (Step S38). When it is determined at Step S38 that an output start command has been given, the control goes to (A).

On the other hand, when it is determined at Step S38 that no output start command has been given, the control goes to Step S39, where it is determined whether there is a next document.

When it is determined at Step S39 that there is another document, the control returns to Step S34 so that document reading is carried out. On the other hand, when it is determined at Step S39 that there is no more document, the control goes to (B).

The processing sequence after (A) is a process when an output start command is given in the middle of a scan-in operation, in which image output is performed based on the second output scheme for performing image output without presenting preview display, by switching the operation mode to the second output scheme.

Specifically, as shown in FIG. 28, when it is determined at Step S38 (FIG. 27) that an output start command has been given, the operation mode is switched to that of the second output scheme by output scheme switching function controller 1312 so that preview images are stopped from being displayed (Step S41). Then, an output stop instructing screen (FIG. 40) is displayed on touch panel display 130 by output stop command key displaying function controller 1315 (Step S42).

Further, it is determined whether an output stop command is given (Step S43). If it is determined at Step S43 that no output stop command has been given, output images are prepared (Step 44) so that image output is implemented (Step S45).

Then, it is determined whether the output process is completed (Step S46). If it is determined that the image output has not been completed, the control returns to Step S44, and the image output process is repeated. When it is determined that the image output has been completed, the image output process is ended.

On the other hand, when it is determined at Step S43 that an output stop command has been given, a mode basic screen (FIG. 41) is displayed on touch panel display 130 (Step S47), and the image output process is ended.

Here, when, in image forming apparatus 100, a command for starting image output by means of image output unit 107 is given during the output operation based on the first output scheme, image output for the image data that has already been input is implemented by the processing sequence after (A) while image data that has not yet been input is continuously captured by the sub-flow executed by input continuation function controller 1313.

Specifically, as shown in FIG. 29, input continuation function controller 1313 continues controlling such that document reader 102 reads documents (Step S51), the read document image data is recorded into storage 105 (Step S52) and image output is performed (Step S53).

Then, it is determined whether there is another document (Step S54), so that the image data input process as well as the image output process is repeated until there is no more document to be read.

On the other hand, the processing sequence after (B) is the process after completion of scan-in preview. That is, this sequence is implemented when an image output start command is given after input of image data has been completed.

Specifically, as shown in FIG. 30, when document reading by document reader 102 is completed, a display image showing a completed state of document reading is displayed (Step S61). At this time, preview images based on the input image data are displayed sequentially from the front page. Then, the control enters a mode for waiting for an image output command, in which it is checked whether the start of image output is directed by touching monochrome start key 5106 or color start key 5108 (Step S62).

It is determined at Step S62 that an image output start command has been given, an image output process is implemented (Step S63). On the other hand, when it is determined at Step S62 that no command for starting image output has been given, the control goes back to Step S61, and the display image indicating a completed state of document reading is displayed to wait for an image output command.

When an image output process is implemented at Step S63, then it is determined whether the image output process is completed (Step S64). When it is determined at Step S64 that the image output process has been completed, the image output process is ended. On the other hand, when it is not determined at Step S64 that the image output process has been completed, the control returns to Step S63, so that the image output process is continued.

In this way, the output process in image forming apparatus 100 is implemented.

In the above way, in image forming apparatus 100, when an output start command is given in the middle of the scan-in operation while scan-in preview output based on the first output scheme is being implemented, the operation mode is switched to the second output scheme in which image output is performed without presenting preview display. As a result, images are directly output based on image data without producing any preview display, hence the user can start image output at any tine when the user wanted to start without the need of waiting for completion of the scan-in operation.

Referring next to the drawings, description will be made on the display guidance in touch panel display 130 that is presented when an output start command is given to actuate an image output operation during an input operation of image data.

FIGS. 31 to 41 are illustrative views showing displayed States of preview images on the touch panel display for reading documents.

Figure 31:
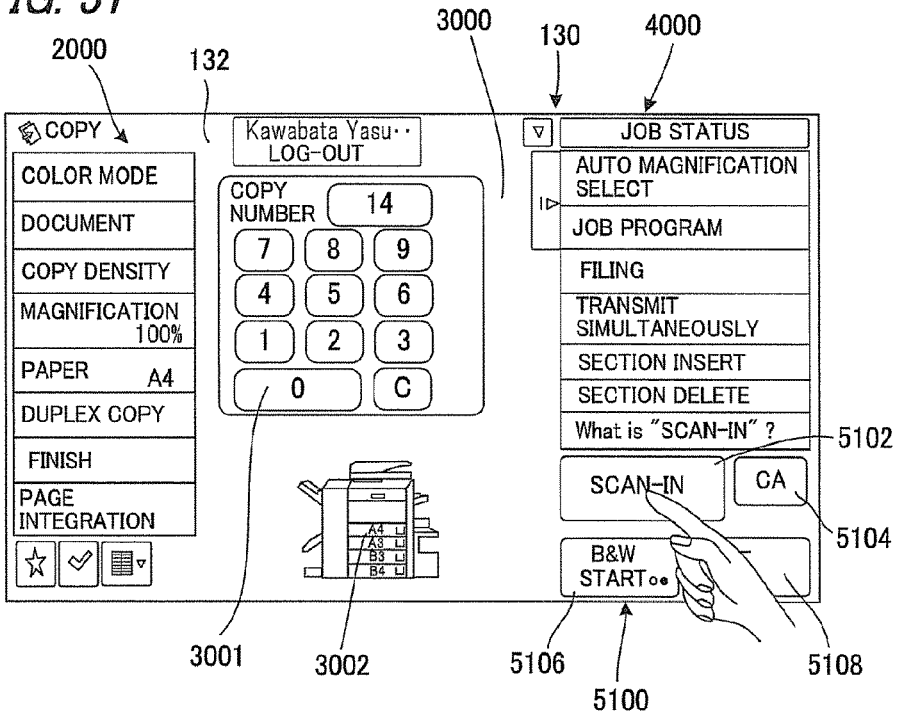
FIG. 31 is an illustrative view showing a display screen on the touch panel display for reading documents.
Figure 32:
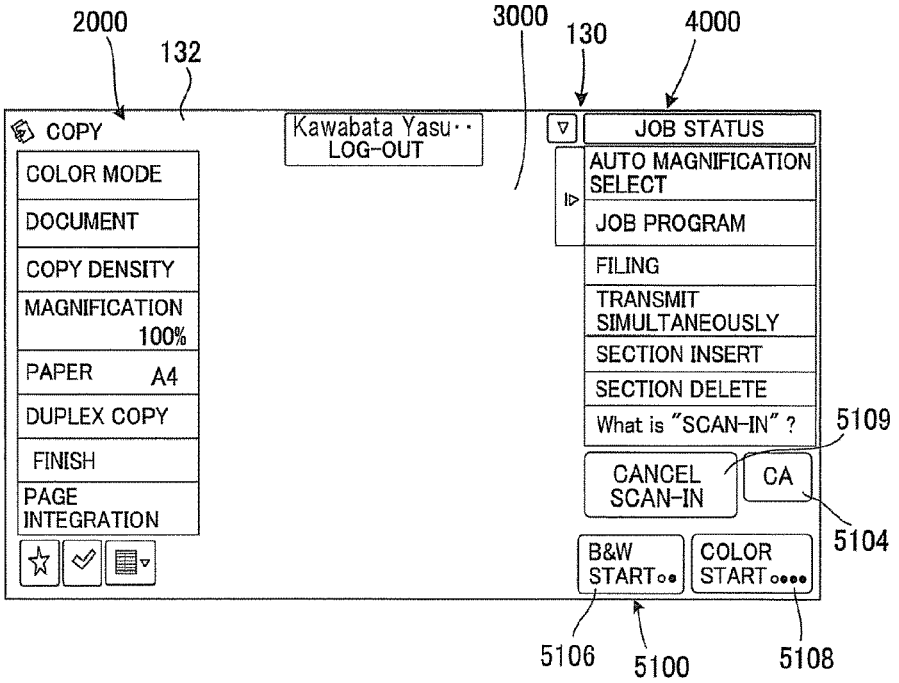
FIG. 32 is an illustrative view showing a displayed state of a preview region on the touch panel display at the time of starting document reading.

In image forming apparatus 100, when documents to be copied are read by document reader 102, the user selects the copy mode in the home screen displayed on touch panel display 130 and touches scan-in key 5102 as shown in FIG. 31 to start document reading.

In this case, A4-sized documents are used and set in long-edge-feed orientation, for example.

When document reading is directed by scan-in key 5102, virtual ten key pad 3001 and mimic display 3002 for presenting the image of the whole apparatus are erased from the screen on display panel 132 as shown in FIG. 31 so that a blank display area is formed in preview region 3000.

Function selecting region 2000, action panel region 4000 and task trigger region 5000 are displayed.

Monochrome start key 5106 and color start key 5108 functioning as the output start command keys are displayed in task trigger region 5000 by output start command key displaying function controller 1314.

Further, instead of scan-in key 5102, scan-in stop key 5109 is displayed.

Figure 33:
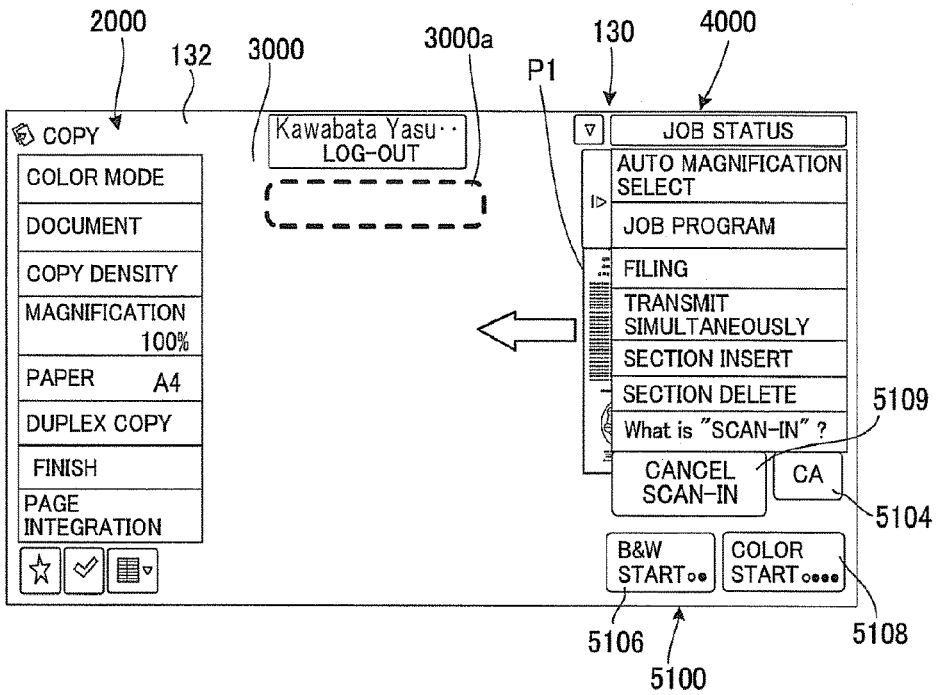
FIG. 33 is an illustrative view showing a displayed state of the first sheet image in the preview region when the document reader of the image forming apparatus starts reading the first document.

When documents are read by document reader 102, a display image reduced in size is generated from the image data of the scanned first sheet document by display image generator 137, and the first sheet image P1 appears from the left side edge of action panel region 4000 and is displayed moving leftwards to the approximate center of preview region 3000, as shown in FIG. 33.

At this timing, a comment such as "scanning in progress" or the like may be displayed near an upper area 3000a of preview region 3000.

Also, a comment indicating that a command for stating image output by image output unit 107 can be accepted during the output operation of the first output scheme may be displayed near, for example upper area 3000a or the like, by output command acceptance notifying function controller 1316.

Further, when the first sheet image P1 appears in preview region 3000, the image may be displayed so as to appear from behind action panel region 4000. At this time, action panel region 4000 may be made see-through to such an extent that the existence of the first sheet image P1 can be known over action panel region 4000.

Figure 34:
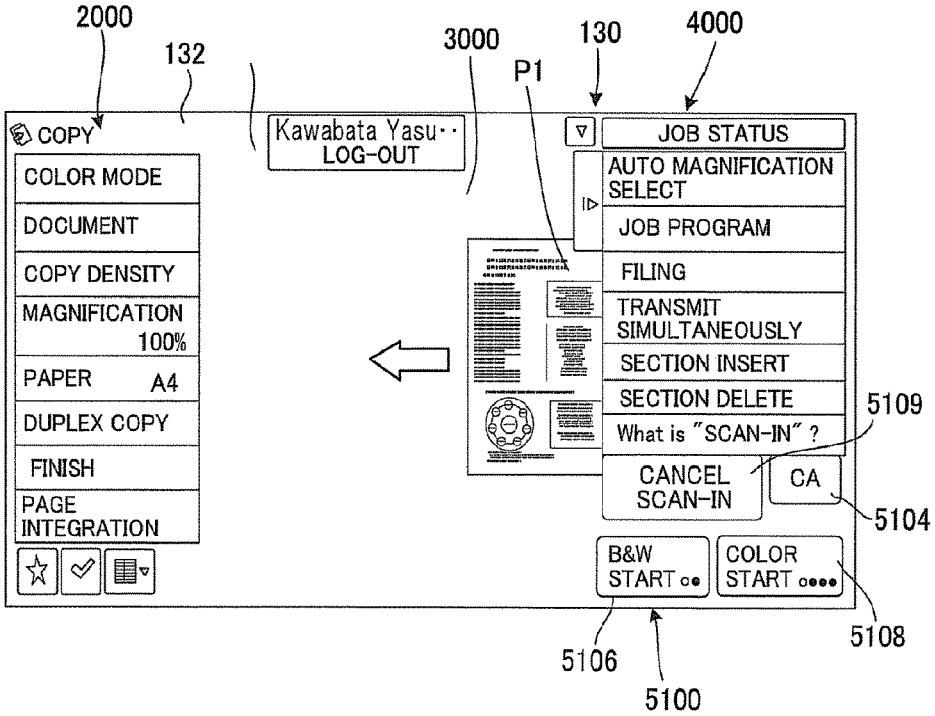
FIG. 34 is an illustrative view showing a displayed state of the first sheet image in the preview region when the document reader is reading the first document.
Figure 35:
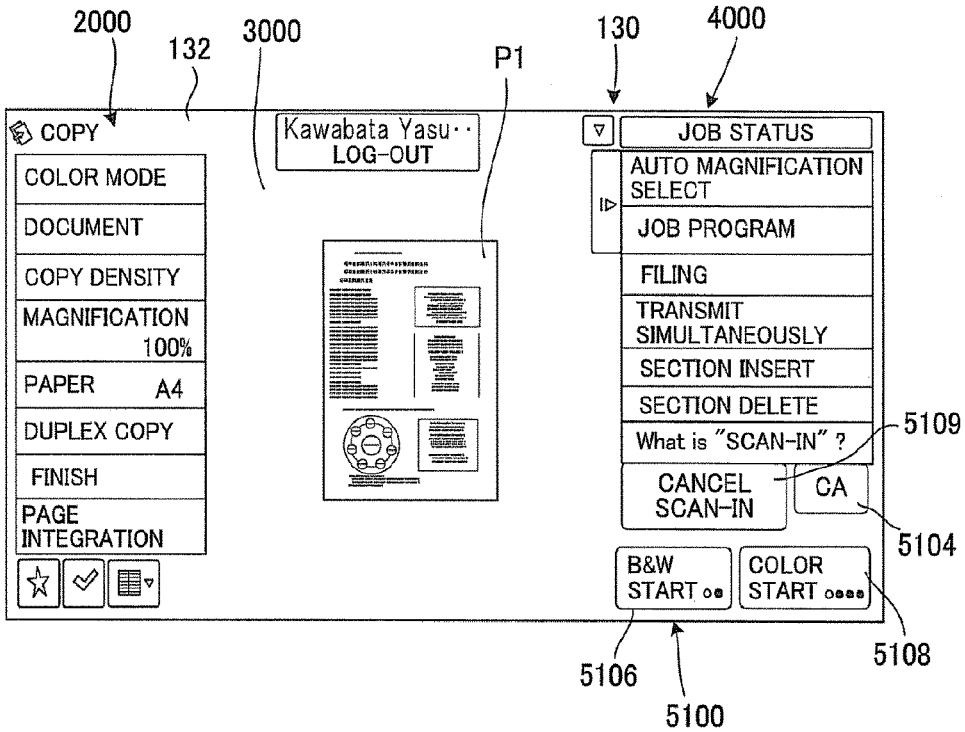
FIG. 35 is an illustrative view showing a displayed state of the first sheet image in the preview region when the document reader has completed the reading of the first document.

As shown in FIG. 34, first sheet image P1 as is moves leftwards during scanning by document reader 102. When the reading of the document is completed, the image is stopped and displayed in the approximate center of preview region 3000, as shown in FIG. 35.

Figure 36:
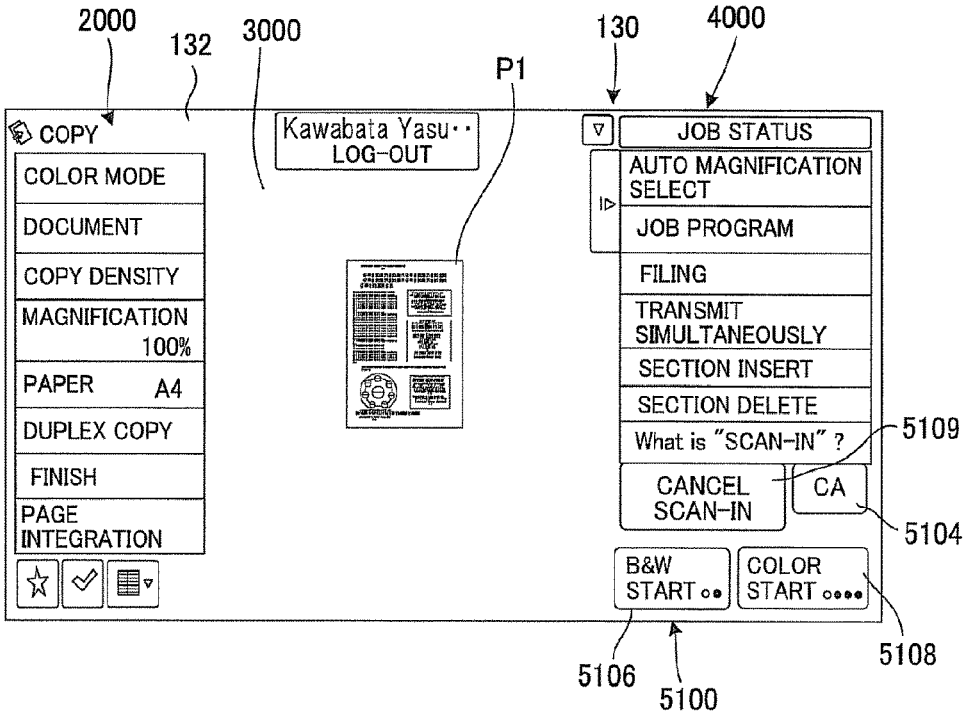
FIG. 36 is an illustrative view showing a state where the first sheet image displayed in the preview region is gradually eliminated.
Figure 37:
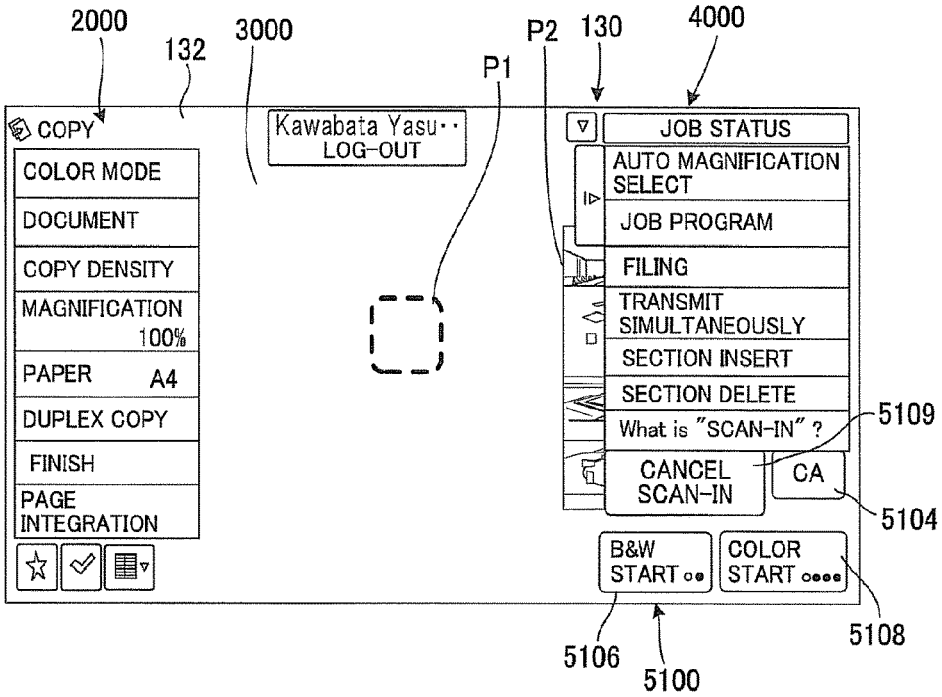
FIG. 37 is an illustrative view showing a displayed state of the second sheet image in the preview region when the document reader starts reading the second document.
Figure 38:
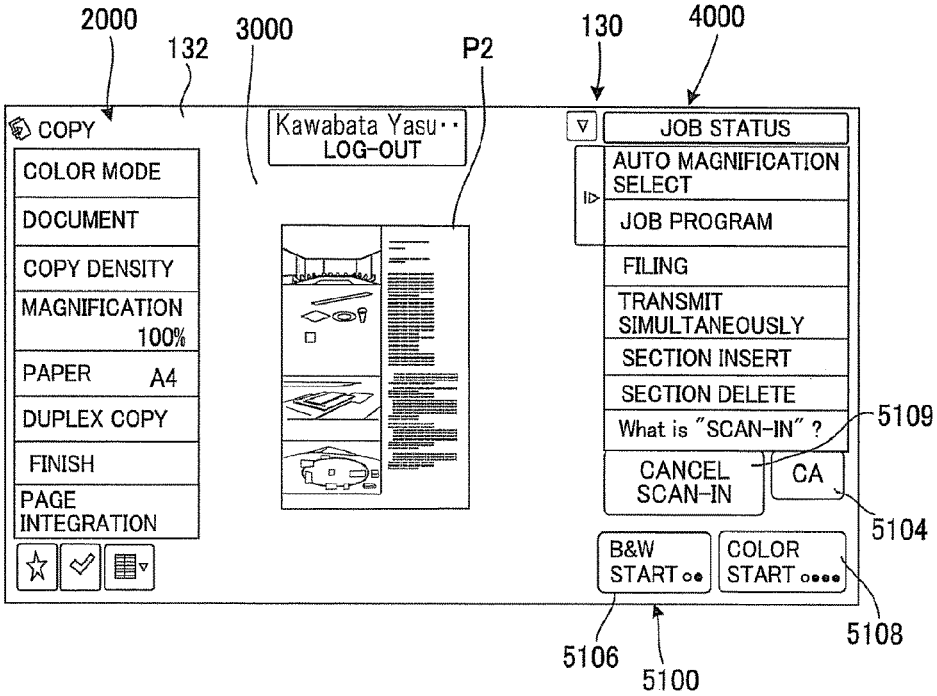
FIG. 38 is an illustrative view showing a displayed state of the second sheet image in the preview region when the document reader has completed the reading of the second document.

Next, when reading of the second document is started, the first sheet image P1 is gradually reduced in size as shown in FIG. 36, faded out and then erased completely (FIG. 37).

In the process of scanning the second document, the second sheet image P2 appears in preview region 3000 from the left side edge of action panel region 4000 while the first sheet image P1 is becoming smaller and going out, as shown in FIG. 37. Then, the first sheet image P1 has gone out completely, the second sheet image P2 is moved leftwards to the approximate center of preview region 3000 and displayed. Then, the second sheet image P2 is stopped and displayed in the approximate center of preview region 3000.

Now, when, in the middle of the input operation being implemented, the user touches monochrome start key 5106 or color start key 5108 after checking the preview of the second document to instruct a start of output, the preview display for guiding the input status of image data is stopped by output scheme switching function controller 1312.

Figure 39:
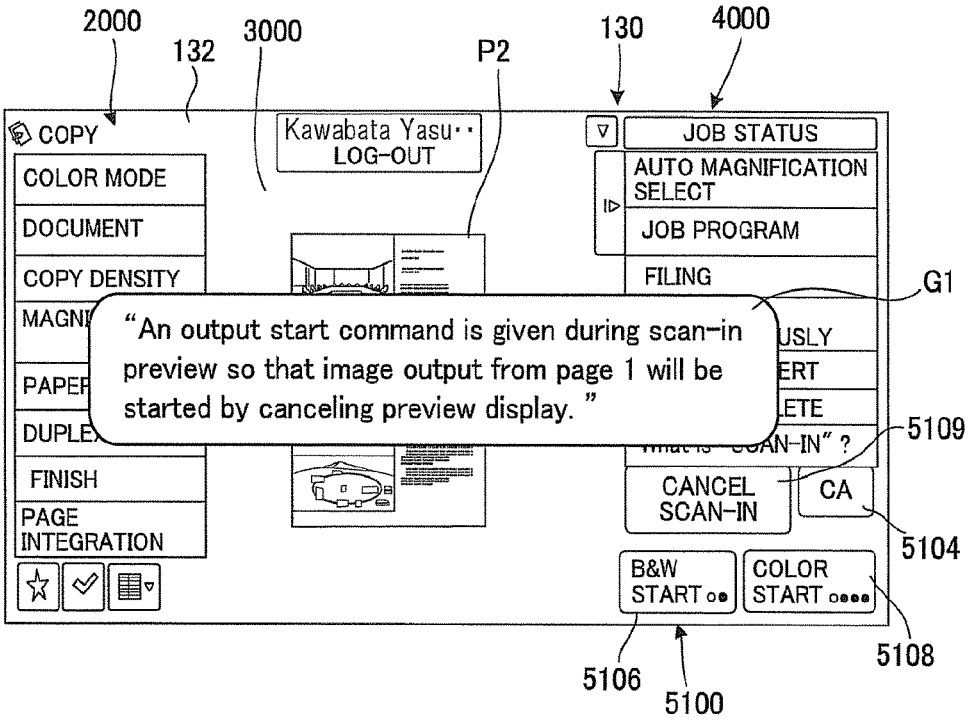
FIG. 39 is an illustrative view showing a display screen presented when an output start command is given in the middle of an input process by the document reader.

Then, a comment G1 notifying the stoppage of preview display and the start of image output is displayed on the display screen, as shown in FIG. 39, by the function of operation status notifying function controller 1317.

As an example of comment G1, "An output start command is given during scan-in preview so that image output from page 1 will be started by canceling preview display." is displayed in the present embodiment.

Then, image output for the image data that has already been input is started while image data that has not yet been input is continuously captured by input continuation function controller 1313.

Figure 40:
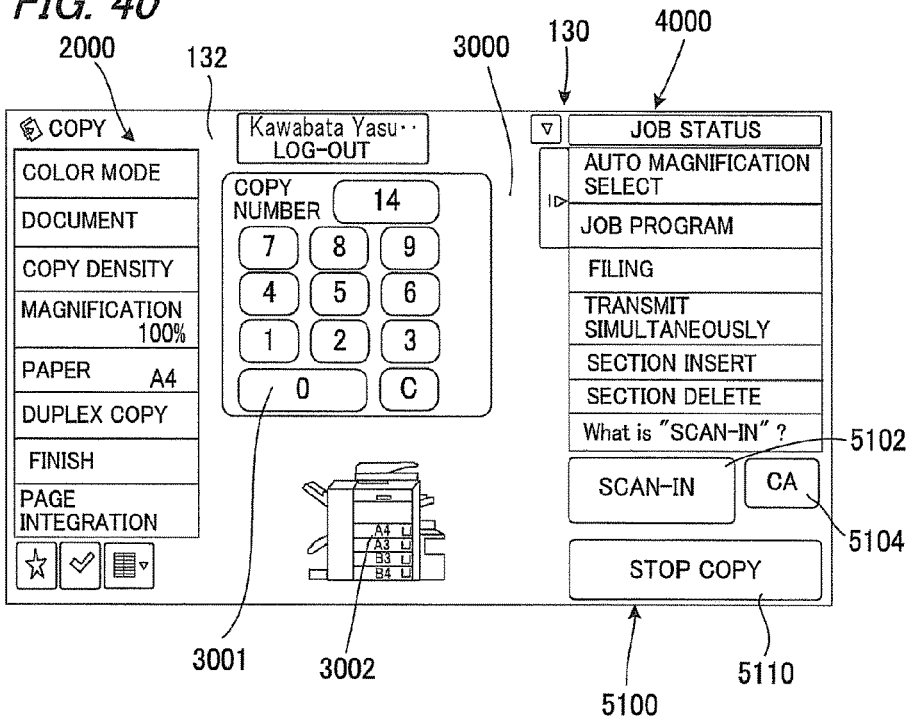
FIG. 40 is an illustrative view showing a display screen presented when an output process is being implemented in the middle of the input process by the document reader; and, FIG. 41 is an illustrative view showing a display screen presented when an output process has been completed in the image forming apparatus.
Figure 41:
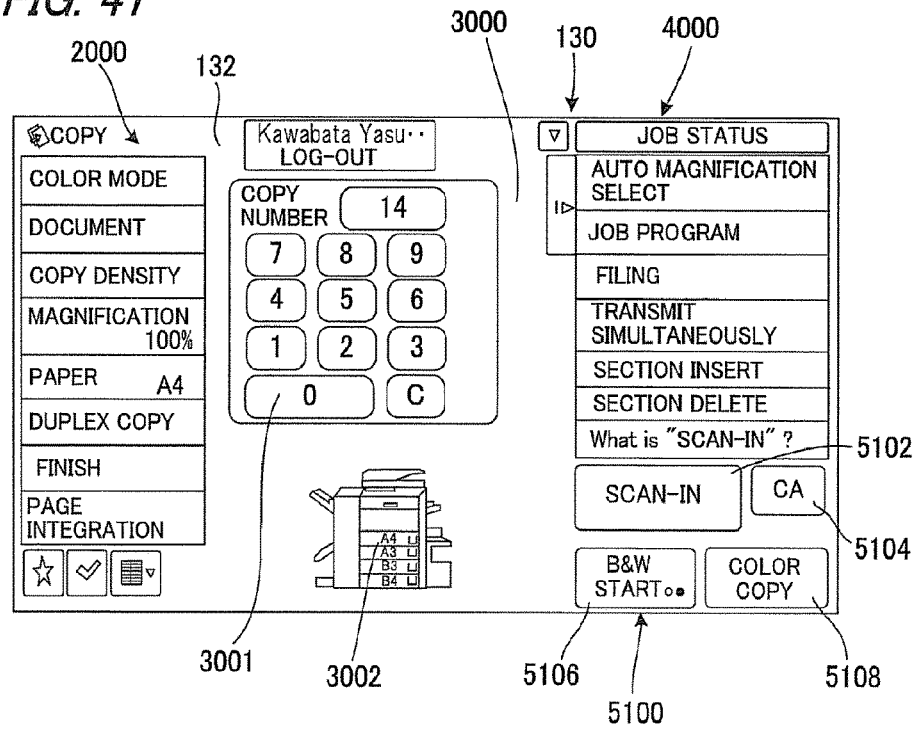

In touch panel display 130, output stop command key displaying function controller 1315 displays an output stop instructing screen including a copy interrupt key (output stop command key) 5110 in place of monochrome start key 5106 or color start key 5108 on the copy mode initial screen, as shown FIG. 40 until the image data that has not yet been input ends, or in other words, until the condition that a next job is acceptable.

When the output of all the image data is completed, the copy mode initial screen is displayed on touch panel display 130 in place of the output stop instructing screen so as to be ready for acceptance of a next job. At this time, monochrome start key 5106 and color start key 5108 are displayed instead of copy interrupt key 5110.

In this way, when a command for starting image output is given during document reading in an output operation, images can be output by canceling preview display so as not to produce preview display of the image data that is input after the output start command while image data that has not yet been input can be continuously captured, whereby it is possible to implement speedy image output.

The above control, that is, the control that enables the user to give an output start command in the middle of document reading as above, is quite effective when, for example, the user wants to start output after review of the preview of the document the user wants, when the user was going to start a direct copying operation but started a scan-in operation by mistake, or when the user has started an image output operation in scan-in preview mode but wants to change the operation mode because the scan-in preview operation takes time longer than expected, into direct copy mode in which the user does not need to wait for completion of all the documents to be scanned.

As described above, control unit-side controller 131B of touch panel display 130 in control unit 120 includes output processing function controller 1311 that is able to control the first output scheme in which, when image data has been input through document reader 102, the images are output after displaying the images to be output in a preview representation on display panel 132 and the second output scheme in which, when image data has been input through document reader 102, the image is directly output without displaying the image to be output in a preview representation on display panel 132.

Further, control unit-side controller 131B includes output scheme switching function controller 1312 that, by stopping preview display, actuates the second output scheme and starts image output when a start command of image output by means of image output unit 107 is given during the output operation of the first output scheme. Accordingly, it is possible to give an output start command in the middle of an scan-in operation, hence it is possible for the user to start output at any time the user wants without waiting for completion of the scan-in operation when a large amount of documents need to be scanned in, or when a scan-in operation is started by mistake. As a result, it is possible to implement a process in conformity with user's intention and hence meet user needs.

Further, since control unit-side controller 131B includes input continuation function controller 1313, it is possible to continue scanning of image data that has not yet been input and output the image data that has been already input, simultaneously. It is hence possible to shorten the processing time.

Since control unit-side controller 131B further includes output start command key displaying function controller 1314, the output start command keys (monochrome start key 5106 and color start key 5108) are displayed during a scan-in operation based on the first output scheme. Accordingly, it is possible to give an output start command at any timing the user wants even in the middle of the scan-in operation.

Since control unit-side controller 131B further includes output stop command key displaying function controller 1315, it is possible to give a command of stopping output during input of image data that has not been yet input.

Accordingly, it is possible to stop image output (or stop scanning) at any time so as to make the apparatus ready for a next job.

Since control unit-side controller 131B further includes output command acceptance notifying function controller 1316, it is possible to notify the user that an output command is acceptable in the middle of a scan-in operation.

Since control unit-side controller 131B further includes operation status notifying function controller 1317, even a user who is unfamiliar with the apparatus can grasp the operation status of the apparatus when an output command is given in the middle of a scan-in operation, hence can use the apparatus without confusion.

The above first and second embodiments were described taking examples in which control unit 120 of the present invention is applied to image forming apparatus 100 shown in FIG. 1. However, as long as it is an image forming apparatus that includes a control unit capable of presenting document images in preview representation on the display panel or the like before printing, the invention can be developed to any other image forming apparatus and the like, not limited to the image forming apparatus and copier having the configuration described above.

Further, the first embodiment was described taking display examples of preview images shown in FIGS. 14 to 22 while the second embodiment was described taking display examples of preview images shown in FIGS. 32 to 38. However, it is also possible to use the method shown in FIGS. 32 to 38 as the display method of preview images in the first embodiment and use the method shown in FIGS. 14 to 22 as the display method of preview images in the second embodiment.

Having described heretofore, the present invention is not limited to the above embodiments, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

[1. An image forming apparatus comprising:

an input unit receiving image data;

an output unit outputting an image formed based on the image data;

a storing unit storing the image data input from the input unit; and, an image display control unit, characterized in that the image display control unit includes:

a display image generator generating a display image based on the image data stored in the storing unit;

a display unit displaying the display image generated by the display image generator; and, a display controller including a function of presenting the display image based on the image data input from the input unit, in a preview representation and an output processing function of implementing an output process by means of the output unit, and the display controller controls a first output scheme in which, when image data has been input through the input unit, the images to be output are displayed in a preview representation on the display unit, and then are output by means of the output unit, and a second output scheme in which, when image data has been input through the input unit, the images to be output are not directly displayed in a preview representation on the display unit, but are directly output by means of the output unit, and wherein the display controller includes a function of displaying an output start command key for instructing a start of image output by means of the image output unit, on the display unit prior to the output of the images based on the first output scheme, and an output process switching function such that, when the start of the output of the images is instructed by the output start command key prior to the output of the image based on the first output scheme, the preview representation is stopped, and the output process is switched to the second output scheme to output the image.]

[2. The image forming apparatus according to claim 1, wherein in the output process by means of the output unit, an identical display is used as a standby screen to be displayed on the display unit for starting the output process, for both the first output scheme and the second output scheme.]

[3. The image forming apparatus according to claim 1, wherein in the output process by means of the output unit, operations after an output start command is given are different between the first output scheme and the second output scheme.]

[4. The image forming apparatus according to claim 1, wherein the display controller includes an output scheme switching function controller which, when a command for starting image output by means of the output unit is given during an output process based on the first output scheme, stops the preview representation and switches the operation to that based on the second output scheme to perform image output.]

[5. The image forming apparatus according to claim 4, wherein the display controller includes an input continuation function controller which, when a command for starting image output by means of the output unit is given during an output process based on the first output scheme, starts image output of the image data that has been already input and continues input of image data that has not yet been input.]

[6. The image forming apparatus according to claim 4, wherein the display controller includes an output start command key displaying function controller which displays an output start command key for instructing the start of image output by means of the image output unit, on the display unit during the output process of the first output scheme.]

[7. The image forming apparatus according to claim 6, wherein the display controller includes an output stop command key displaying function controller which displays an output stop command key for instructing the stoppage of output until image data that has not been yet input ends when the start of image output by the means of image output unit is directed during the output process of the first output scheme.]

[8. The image forming apparatus according to claim 4, wherein the display controller includes an output command acceptance notifying function controller which notifies that the start of image output by means of the image output unit can be directed during the output process of the first output scheme.]

[9. The image forming apparatus according to claim 4, wherein the display controller includes an operation status notifying function controller which notifies the operation status of the apparatus when the start of image output by means of the image output unit is directed during the output process of the first output scheme.]

*10. An image forming apparatus comprising:*

*an input unit receiving image data;*

*an output unit outputting an image formed based on the image data;*

*a storing unit storing the image data input from the input unit; and,*

*an image display control unit, characterized in that the image display control unit includes:*

*a display image generator generating a display image based on the image data stored in the storing unit;*

*a display unit displaying the display image generated by the display image generator; and*

*a display controller including a function of displaying the display image based on the image data input from the input unit, in a preview representation on the display unit and an output processing function of implementing an output process by means of the output unit,*

*the display controller has a function for implementing:*

*a first output scheme in which, when image data has been input through the input unit, the images are output by the output unit after having displayed the display image generated by the display image generator in the preview representation on the display unit; and*

*a second output scheme in which, when image data has been input through the input unit, the images are directly output by the output unit without displaying the display image generated by the display image generator in the preview representation on the display unit; and*

*wherein the display controller includes a function of displaying an output start command key for instructing a start of image output by means of the output unit, on the display unit prior to the output of the images based on the first output scheme, and an output process switching function such that, when the start of the output of the images is instructed by the output start command key in the middle of the input of the image data, the output process is switched to the second output scheme to output the images.*

*11. The image forming apparatus according to claim 10, wherein a start command of the first output scheme and a start command of the second output scheme are given on an identical standby screen used for instructing a start of the output process and displayed on the display unit.*

*12. The image forming apparatus according to claim 10, wherein in the output process by means of the output unit, operations after an output start command is given are different between the first output scheme and the second output scheme.*

*13. The image forming apparatus according to claim 10, wherein the display controller includes an output scheme switching function controller which, when a command for starting image output by means of the output unit is given during an output process based on the first output scheme, stops the preview representation and switches an operation to that based on the second output scheme to perform image output.*

*14. The image forming apparatus according to claim 13, wherein the display controller includes an input continuation function controller which, when the command for starting the image output by means of the output unit is given during the output process based on the first output scheme, starts image output of the image data that has been already input and continues input of image data that has not yet been input.*

*15. The image forming apparatus according to claim 13, wherein the display controller includes an output start command key displaying function controller which displays an output start command key for instructing the start of the image output by means of the output unit, on the display unit during the output process based on the first output scheme.*

*16. The image forming apparatus according to claim 15, wherein the display controller includes an output stop command key displaying function controller which displays an output stop command key for instructing a stoppage of output until input of image data that has not been yet input ends when the start of the image output by means of the output unit is instructed during the output process based on the first output scheme.*

*17. The image forming apparatus according to claim 13, wherein the display controller includes an output command acceptance notifying function controller which notifies that the start of the image output by means of the output unit can be instructed during the output process based on the first output scheme.*

*18. The image forming apparatus according to claim 13, wherein the display controller includes an operation status notifying function controller which notifies the operation status of the apparatus when the start of the image output by means of the output unit is directed during the output process based on the first output scheme.*

*19. The image forming apparatus according to claim 10, wherein when input of the image data through the input unit is stopped during the first output scheme, the display controller implements the second output scheme.*

*20. The image forming apparatus according to claim 19, wherein when the input of the image data through the input unit is stopped, a process for outputting the image is implemented based on an output start command.*

*21. The image forming apparatus according to claim 19, wherein a start command of the first output scheme and a start command of the second output scheme are given on an identical standby screen used for instructing a start of the output process and displayed on the display unit.*

*22. The image forming apparatus according to claim 10, wherein*

*the output start command key is displayed on the display unit after input of the image data has been started; and*

*when the start of the image output is instructed by the output start command key in the middle of the input of the image data, the second output scheme is implemented to output the images.*

*23. The image forming apparatus according to claim 22, wherein, when input of the image data through the input unit is stopped during the first output scheme, the second output scheme is implemented.*

* * * * *